US011688293B2

United States Patent
Rönnäng et al.

(10) Patent No.: US 11,688,293 B2
(45) Date of Patent: Jun. 27, 2023

(54) PROVIDING EDUCATIONAL MEDIA CONTENT ITEMS BASED ON A DETERMINED CONTEXT OF A VEHICLE OR DRIVER OF THE VEHICLE

(71) Applicant: Volvo Car Corporation, Gothenburg (SE)

(72) Inventors: Magnus Rönnäng, Västra Frölunda (SE); Staffan Davidsson, Västra Frölunda (SE)

(73) Assignee: VOLVO CAR CORPORATION, Gothenburg (SE)

( * ) Notice: Subject to any disclaimer, the term of this patent is extended or adjusted under 35 U.S.C. 154(b) by 1039 days.

(21) Appl. No.: 16/369,269

(22) Filed: Mar. 29, 2019

(65) Prior Publication Data

US 2020/0312172 A1     Oct. 1, 2020

(51) Int. Cl.
    *G06N 5/04*     (2023.01)
    *G06N 3/08*     (2023.01)
    (Continued)

(52) U.S. Cl.
    CPC ............. *G09B 5/00* (2013.01); *G06N 3/08* (2013.01); *G06N 5/04* (2013.01); *G09B 5/02* (2013.01);
    (Continued)

(58) Field of Classification Search
    CPC ........ G09B 19/167; G09B 19/16; G09B 5/02; G09B 5/04; G09B 5/065; G09B 9/042; G06N 3/08; G06N 5/04
See application file for complete search history.

(56) References Cited

U.S. PATENT DOCUMENTS 8,121,784 B2    2/2012   Templeton et al.
9,088,572 B2 *   7/2015   Ricci ................... H04L 65/611
(Continued)

FOREIGN PATENT DOCUMENTS

CN        104813680 A     7/2015

OTHER PUBLICATIONS

I.-H. Kim, J.-H. Bong, J. Park, and S. Park, "Prediction of Driver's Intention of Lane Change by Augmenting Sensor Information Using Machine Learning Techniques", Jun. 2017, Sensors (Year: 2017).*
(Continued)

*Primary Examiner* — Jay Trent Liddle
*Assistant Examiner* — Alyssa N Brandley
(74) *Attorney, Agent, or Firm* — Amin, Turocy & Watson, LLP

(57) ABSTRACT

Techniques are described for providing educational media content. According to an embodiment, a system for providing, by a processor, educational media content items based on a determined context of a vehicle or driver of the vehicle is described. The system can comprise a context component that can determine a context of a vehicle or a driver of the vehicle, with the context component employing at least one of artificial intelligence or machine learning to facilitate inferring intent of the driver. The system can comprise a vehicle education component that can perform a utility-based analysis in connection with selecting a media content item relating to a feature of the vehicle based on the determined context, the inferred driver intent and the utility-based analysis. Further, the system can comprise a media component that can output the selected media content item.

20 Claims, 13 Drawing Sheets

(51) Int. Cl.
  *G09B 9/042* (2006.01)
  *G09B 5/06* (2006.01)
  *G09B 5/02* (2006.01)
  *G09B 5/04* (2006.01)
  *G09B 5/00* (2006.01)
  *G09B 19/16* (2006.01)
(52) U.S. Cl.
  CPC ............... *G09B 5/04* (2013.01); *G09B 5/065* (2013.01); *G09B 9/042* (2013.01); *G09B 19/167* (2013.01)

(56) References Cited

U.S. PATENT DOCUMENTS

| | | | |
|---|---|---|---|
| 9,376,117 B1* | 6/2016 | Parundekar | B60W 50/087 |
| 9,390,757 B2 | 7/2016 | Shahraray et al. | |
| 9,798,509 B2 | 10/2017 | Panguluri et al. | |
| 9,956,876 B2 | 5/2018 | Wu et al. | |
| 10,067,988 B2 | 9/2018 | Choksi et al. | |
| 10,140,502 B1* | 11/2018 | Shilo | H04L 9/0866 |
| 10,235,882 B1* | 3/2019 | Aoude | G08G 1/093 |
| 10,893,010 B1* | 1/2021 | Argenti | B60W 50/14 |
| 11,151,880 B1* | 10/2021 | Shou | G08G 1/0141 |
| 2003/0108847 A1* | 6/2003 | Reh | G10L 15/22 704/E15.04 |
| 2003/0144775 A1* | 7/2003 | Klausner | B60R 16/0234 701/33.4 |
| 2004/0093155 A1* | 5/2004 | Simonds | H04L 67/12 701/532 |
| 2005/0172230 A1 | 8/2005 | Burk et al. | |
| 2006/0024646 A1* | 2/2006 | Stahl | G09B 9/04 434/62 |
| 2010/0184005 A1 | 7/2010 | Eklund et al. | |
| 2010/0274410 A1* | 10/2010 | Tsien | G06F 16/9537 701/1 |
| 2011/0099519 A1 | 4/2011 | Ma et al. | |
| 2013/0091054 A1 | 4/2013 | Nathan et al. | |
| 2013/0132172 A1 | 5/2013 | Liu et al. | |
| 2014/0136013 A1* | 5/2014 | Wolverton | B60W 50/10 701/1 |
| 2014/0188920 A1* | 7/2014 | Sharma | G06F 16/635 707/758 |
| 2014/0272811 A1* | 9/2014 | Palan | G07C 5/008 434/66 |
| 2015/0030998 A1* | 1/2015 | Liu | G09B 19/167 434/62 |
| 2015/0074022 A1 | 3/2015 | Cornelius et al. | |
| 2015/0092056 A1* | 4/2015 | Rau | B60R 11/04 348/148 |
| 2015/0127818 A1 | 5/2015 | Bates et al. | |
| 2015/0262484 A1* | 9/2015 | Victor | G09B 9/04 701/1 |
| 2016/0117947 A1* | 4/2016 | Misu | G06F 3/0482 |
| 2016/0351075 A1* | 12/2016 | Hookham-Miller | G06F 3/0482 |
| 2017/0061826 A1* | 3/2017 | Jain | G09B 5/06 |
| 2017/0072850 A1* | 3/2017 | Curtis | G08G 1/166 |
| 2017/0291543 A1* | 10/2017 | Goldman-Shenhar | B60Q 9/00 |
| 2017/0301260 A1* | 10/2017 | Gussen | G09B 5/06 |
| 2018/0053102 A1* | 2/2018 | Martinson | G08G 1/09623 |
| 2018/0170256 A1* | 6/2018 | Medenica | B60R 16/037 |
| 2018/0174457 A1* | 6/2018 | Taylor | G08G 1/096741 |
| 2018/0188054 A1 | 7/2018 | Kennedy et al. | |
| 2018/0284785 A1* | 10/2018 | Berntorp | G06V 20/584 |
| 2018/0357233 A1 | 12/2018 | Daze et al. | |
| 2019/0019068 A1* | 1/2019 | Zhu | G06V 10/82 |
| 2019/0088135 A1* | 3/2019 | Do | G05D 1/0088 |
| 2019/0152386 A1* | 5/2019 | McQuillen | B60R 16/037 |
| 2019/0322290 A1* | 10/2019 | Van Hoecke | B60R 16/0234 701/33.4 |
| 2019/0392308 A1* | 12/2019 | Bhatnagar | G06N 3/08 |
| 2020/0070846 A1* | 3/2020 | Elswick | B60L 53/14 |
| 2020/0079369 A1* | 3/2020 | Kuehnle | B60W 50/16 |
| 2020/0108724 A1* | 4/2020 | Bartlett | B60L 53/14 |
| 2020/0180609 A1* | 6/2020 | Dieckmann | B60W 50/14 |
| 2020/0234610 A1* | 7/2020 | Kleiner | H04L 9/0866 |
| 2020/0300648 A1* | 9/2020 | Graf | G08G 1/0141 |
| 2020/0311119 A1 | 10/2020 | Rönnäng et al. | |
| 2022/0050524 A1* | 2/2022 | Hassani | B60W 50/10 |

OTHER PUBLICATIONS

H. Berndt and K. Dietmayer, "Driver Intention Inference with Vehicle Onboard Sensors", Nov. 2009, IEEE Int. Conf. Veh. Electron. Saf., pp. 102-107 (Year: 2009).*

S. Damiani, E. Deregibus, and L. Andreone, "Driver-vehicle interfaces and interaction: where are they going?", May 2009, Eur. Transp. Res. Rev., pp. 87-96 (Year: 2009).*

L. Ciardelli, A. Beoldo, F. Pasini, and C. Regazzoni, "Driver's Behavior Assessment by On-board/Off-board Video Context Analysis" , Jun. 2010, IEA/AIE, pp. 450-459 (Year: 2010).*

L. Rodzina and S. Kristoffersen, "Context-Dependent Car Navigation as Kind of Human-Machine Collaborative Interaction", May 2013, Int. Conf. on Collaboration Technologies & Systems, pp. 253-259 (Year: 2013).*

J.I. Árnason, J. Jepsen, A. Koudal, M.R. Schmidt, and S. Serafin, "Volvo intelligent news: A context aware multi modal proactive recommender system for in-vehicle use", Jul. 2014, Pervasive Mob. Comput., pp. 95-111 (Year: 2014).*

E. Ohn-Bar, A. Tawari, S. Martin, and M.M. Trivedi, "On surveillance for safety critical events: In-vehicle video networks for predictive driver assistance systems", May 2015, Comput. Vis. Image Underst., pp. 130-140 (Year: 2015).*

C. Bila, F. Sivrikaya, M.A. Khan, and S. Albayrak, "Vehicles of the Future: A Survey of Research on Safety Issues", May 2017, Trans. Intell. Transport. Syst., pp. 1046-1065 (Year: 2017).*

J. Chang, W. Yao, and X. Li, "The design of a context-aware service system in intelligent transportation system", Oct. 2017, Int. J. Distrib. Sens. Netw., pp. 1-18 (Year: 2017).*

L.-H. Kim, J.-H. Bong, J. Park, and S. Park, "Prediction of Driver's Intention of Lane Change by Augmenting Sensor Information Using Machine Learning Techniques", Jun. 2017, Sensors (Year: 2017).*

A. Taramov and N. Shilov, "A Systematic Review of Proactive Driver Support Systems and Underlying Technologies", Apr. 2017, FRUCT, pp. 448-459 (Year: 2017).*

Y. Xing, C. Lv, H. Wang, H. Wang, Y. Ai, D. Cao, and F.-Y. Wang, "Driver Lane Change Intention Inference for Intelligent Vehicles: Framework, Survey, and Challenges", Mar. 2019, IEEE Trans. Veh. Technol., pp. 4377-4390 (Year: 2019).*

Non Final office action received for U.S. Appl. No. 16/369,227 dated May 10, 2021, 43 pages.

Non-Final Office Action received for U.S. Appl. No. 16/369,606 dated Sep. 7, 2021, 25 pages.

Non-Final Office Action received for U.S. Appl. No. 16/369,606 dated Oct. 20, 2021, 13 pages.

Non-Final Office Action received for U.S. Appl. No. 16/369,606 dated Oct. 8, 2021, 74 pages.

Non final office action received for U.S. Appl. No. 16/369,227 dated Aug. 10, 2020, 40 pages.

Final office action received for U.S. Appl. No. 16/369,227 dated Dec. 22, 2020, 40 pages.

\* cited by examiner

PROVIDING EDUCATIONAL MEDIA CONTENT ITEMS BASED ON A DETERMINED CONTEXT OF A VEHICLE OR DRIVER OF THE VEHICLE

TECHNICAL FIELD

This application relates to content presentation systems, and more particularly, to techniques for presenting educational content in a vehicle.

BACKGROUND

The presentation of audio and/or video content within a vehicle has become common in many traveling experiences. For example, vehicle drivers often listen to audio content (e.g., music and/or audible text) while driving, and riders often watch videos within the vehicle while waiting to reach their destination. Vehicles also have basic systems for notifying a driver about different conditions, e.g., keys have been left in vehicle, that traction control systems are enabled, and other like circumstances. These systems generally output basic sounds and/or lights that are activated as a warning of a current condition. While both of these systems provide output, notification systems can provide a small fraction of the content provided by vehicle media systems.

As a result of the small amounts of immediate information presented by the notification systems, drivers can be left having to address complex immediate conditions without guidance, e.g., identification and use of vehicle features that can be used to adapt to conditions. In another instance, after conditions with which the driver was unfamiliar have passed, e.g., when the driver has the ability to learn more about the vehicle, no additional information specific to the conditions is presented.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are presented that facilitate providing educational media content items based on a determined context of a vehicle or driver of the vehicle.

According to one or more embodiments, a system for providing educational media content items based on a determined context of a vehicle or driver of the vehicle is provided. The system can comprise a processor, operatively coupled to at least one memory, that can execute computer-executable components stored in the at least one memory. The system can comprise a context component that can determine a context of a vehicle or a driver of the vehicle, with the context component employing at least one of artificial intelligence or machine learning to facilitate inferring intent of the driver. The system can comprise a vehicle education component that can perform a utility-based analysis by factoring cost of making an incorrect selection versus benefit of making a correct selection in connection with selecting a media content item relating to a feature of the vehicle based on the determined context, the inferred driver intent and the utility-based analysis. Further, the system can comprise a media component that can output the selected media content item.

In some implementations, the system can further comprise an object sensing component that can identify an object within proximity to the vehicle, and the determined context can comprise information relating to the object. Additionally, the selected media content item can relate to a feature of the vehicle for adapting to the object. In some implementations, the system can further comprise at least one sensor that can sense physical attributes of the driver and the determined context can comprise the physical attributes of the driver. In another example, the system can determine context information relating to driver operation of the vehicle, and the selected media content item can relate to a feature of the vehicle for adapting to the driver operation of the vehicle.

In some embodiments, elements described in connection with the disclosed devices and systems can be embodied in different forms such as a computer-implemented method, a computer program product, or another form.

According to another embodiment, a computer-implemented method for providing educational media content items based on a determined context of a vehicle or driver of the vehicle is provided. The computer-implemented method can comprise using a processor operatively coupled to at least one memory to determine a context of a vehicle or a driver of the vehicle, with the determining the context employing at least one of artificial intelligence or machine learning to facilitate inferring intent of the driver. The computer-implemented method can comprise using the processor to perform a utility-based analysis, by factoring cost of making an incorrect selection versus benefit of making a correct selection in connection with selecting a media content item relating to a feature of the vehicle based on the determined context, the inferred driver intent and the utility-based analysis. Further, the computer-implemented method can comprise using the processor to output the selected media content item.

In some implementations, the computer-implemented method can comprise information relating to driver operation of the vehicle, with the selected media content item relating to a feature of the vehicle for adapting to the driver operation of the vehicle. In one or more embodiments, the computer-implemented method can further comprise identifying an object within proximity to the vehicle, and the determined context can comprise information relating to the object, with the selected media content item relating to a feature of the vehicle for adapting to the object.

According to another embodiment, a computer program product for providing educational media content items based on a determined context of a vehicle or driver of the vehicle is described. The computer-program product can comprise a computer readable storage medium having program instructions embodied therewith. The program instructions can be executable by a processor to cause the processor to determine, by the processor, a context of a vehicle or a driver of the vehicle, with the determining the context employing at least one of artificial intelligence or machine learning to facilitate inferring intent of the driver. The program instructions can further cause the processor to perform, by the processor, a utility-based analysis, by factoring cost of making an incorrect selection versus benefit of making a correct selection in connection with selecting a media content item relating to a feature of the vehicle based on the determined context, the inferred driver intent and the utility-based analysis. The program instructions can further cause the processor to output, by the processor, the selected media content item.

DETAILED DESCRIPTION

Figure 1:
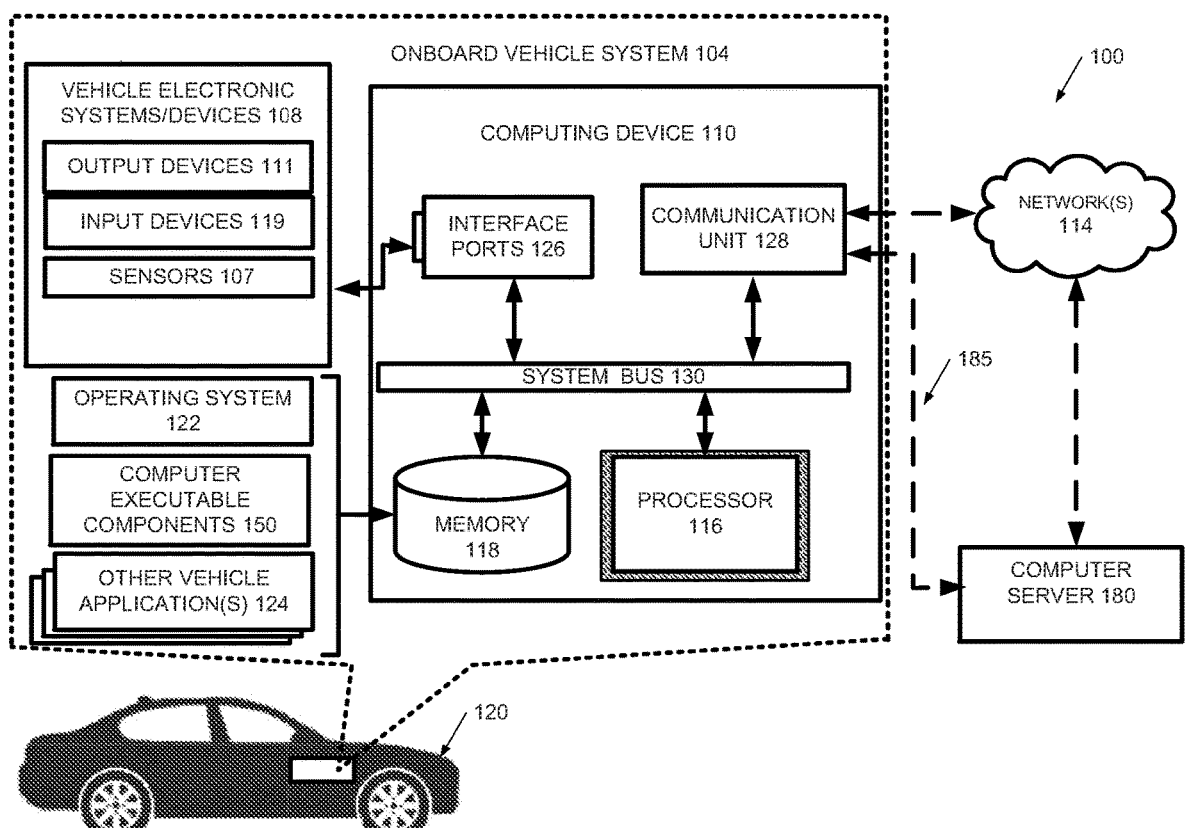
FIG. 1 illustrates a block diagram of an example, non-limiting system that can facilitate providing educational media content items based on a determined context of a vehicle or driver of the vehicle, in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Summary section or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. As used in this disclosure, the terms "entity," "entities," "driver," "passenger," and the like refer to a person that can employ one or more of the embodiments described herein.

The computer processing systems, computer-implemented methods, apparatus and/or computer program products described herein employ hardware and/or software to solve problems that are highly technical in nature (e.g., using artificial intelligence or machine learning to quickly analyze potentially large amounts of data to determine contexts, and selection of media content items for a broad variety of contexts), that are not abstract and cannot be performed as a set of mental acts by a human. For example, a human, or even a plurality of humans, cannot efficiently, accurately and effectively manually analyze and/or prioritize the voluminous amounts of contextual data that can be received while traveling, with the same level of accuracy and/or efficiency as the various embodiments described herein. Moreover, a human, or even a plurality of humans, cannot efficiently, accurately and effectively, based on determined contexts, quickly select from voluminous amounts of media content items to present in response to the determined context. For instance, one or more embodiments described herein can analyze and/or process a vast amount of educational content (e.g., including a multitude of audio, video, still image, and other types of content) while a vehicle is operating. In another example, time spent by a human analyzing and selecting media content items can be a direct detriment to the presentation of content in response to the determined context, e.g., spending more time manually analyzing and or selecting media content items can cause a delay that would no longer allow the presentation of the media content items in time to be a useful response to the determined context.

Further, some of the processes performed can be performed by specialized computers for carrying out defined tasks related to providing educational media content items based on a determined context of a vehicle. One or more embodiments described herein can be employed to solve new problems that arise through advancements in technology, computer networks, the Internet, and the like. System 100 or other systems detailed herein can provide technical improvements to the context-sensitive provision of educational content in a vehicle by ways that include, but are not limited to, improved context determining, improved selection of educational and informative content, and improved presentation of selected media content items in time to be useful for a determined context.

Contexts determined by one or more embodiments can include brief situations (e.g., windshield wipers not engaged in the rain) or longer situations. Examples of these situations can include, but are not limited to, a test drive of a vehicle by a driver unfamiliar with the vehicle, a situation where the vehicle may require servicing (e.g., the vehicle has a flat tire or requires an oil change), and use of a vehicle in hazardous road segments and conditions. In addition to the above, one or more embodiments can consider drivers with long-term access and short-term access to vehicle 120. Long-term access to vehicle 120 can include, but is not limited to, ownership of a vehicle, leasing of a vehicle, regular use of a vehicle for work purposes, and other long-term arrangements whereby a driver regularly uses vehicle 120. Short-term access to vehicle 120 can include, but is not limited to, renting a vehicle, using a vehicle in a vehicle sharing program (e.g., short-term rental of a vehicle), using a vehicle in a peer-to-peer car sharing program, using the vehicle as a driver in a peer-to-peer ridesharing service, and other shared mobility programs.

Where vehicle 120 is used in a peer-to-peer ridesharing context, one or more embodiments can also consider the familiarity of ridesharing passengers to vehicle 120. In this example, vehicle 120 can have various features that can be used to increase the safety and comfort of passengers. Based on sensors 107 that can detect passengers (e.g., occupant weight sensors discussed with FIG. 4 below), one or more embodiments can detect the presence of one or more passengers and select one or more content items that can, for example, and explain the use of the seat belts, and why they are important to use, describe the safety features of vehicle 120, identify the controls that can adjust the seats. Unlike content items presented to the driver, in this context media component can select an output device 111 for use in the back seat of vehicle 120, e.g., using displays 301 on the back of the front seats.

One or more embodiments can use the regularity of use of vehicle 120, along with other data discussed below, to assess driver familiarity with features of vehicle 120, as well as inferring the intent of the driver in different circumstances. These and additional contexts are described below to provide additional operational details of one or more embodiments.

FIG. 1 illustrates a block diagram of an example, non-limiting system 100 that can facilitate providing educational media content items based on a determined context of a vehicle 120 or driver of the vehicle 120, in accordance with one or more embodiments of the disclosed subject matter.

In accordance with various embodiments, system 100 can be deployed on or within a vehicle 120, (e.g., an automobile, as shown in FIG. 1), to facilitate presenting various forms of content within the vehicle. Although FIG. 1 depicts the vehicle 120 as an automobile, the architecture of the system 100 is not so limited. For instance, the system described herein can be implemented with a variety of types of vehicles 120. Example vehicles 120 that can incorporate the system 100 can include, but are not limited to: automobiles, airplanes, trains, motorcycles, carts, trucks, semi-trucks, buses, boats, recreational vehicles, helicopters, jets, scooters, a combination thereof, and/or the like.

As shown in FIG. 1, system 100 can comprise one or more onboard vehicle systems 104, which can include one or more input devices 119, one or more sensors 107, one or more output devices 111, one or more other vehicle electronic systems and/or devices 108, and/or one or more computing devices 110. One or more embodiments can use output devices 111 to output media content items selected based on the determined context, sensors 107 to determine a context for vehicle 120 or an occupant of vehicle 120, and can use input devices 119 to receive configuration information for embodiments. These three vehicle electronic systems and/or devices 108 are respectively described with FIGS. 3, 4, and 6 below. Additionally, the system 100 can be communicatively and/or operatively coupled to one or more computer servers 180 via components of communication unit 128 by one or more networks 114 and/or a direct electrical connection 185.

The one or more computing devices 110 can facilitate executing and controlling one or more operations of the vehicle 120, including one or more operations of the one or more input devices 119, output devices 111, and sensors 107, and other vehicle electronic systems and/or devices 108 using machine-executable instructions. In this regard, embodiments of system 100 and other systems described herein can include one or more machine-executable components embodied within one or more machines (e.g., embodied in one or more computer readable storage media associated with one or more machines, such as computing device 110). Such components, when executed by the one or more machines (e.g., processors, computers, virtual machines, etc.) can cause the one or more machines to perform the operations described.

For example, the one or more computing devices 110 can include or be operatively coupled to at least one memory 118 and/or at least one processor 116. The one or more processors 116 can be any of various available processors. For example, dual microprocessors and other multiprocessor architectures also can be employed as one or more processors 116. In various embodiments, at least one memory 118 can store software instructions embodied as functions and/or applications that when executed by at least one processor 116, facilitate performance of operations defined by the software instructions. In the embodiment shown, these software instructions can include one or more of operating systems 122, one or more computer-executable components 150, and/or one or more other vehicle applications 124. For example, the one or more operating systems 122 can act to control and/or allocate resources of the one or more computing devices 110. It is to be appreciated that the claimed subject matter can be implemented with various operating systems or combinations of operating systems.

The one or more computer executable components 150 and/or the one or more other vehicle applications 124 can take advantage of the management of resources by the one or more operating systems 122 through program modules and program data also stored in the one or more memories 118. The one or more computer executable components 150 can provide various features and/or functionalities that can facilitate providing educational information based on the determined context of the vehicle and/or driver of the vehicle and/or one or more entity preferences and/or controlling the one or more other vehicle applications 124. Example, other vehicle applications 124 can include, but are not limited to: a navigation application, a phone application, a vehicle settings application, a parking assistance application, an emergency roadside assistance application, a combination thereof, and/or the like. The features and functionalities of the one or more computer executable components 150 are discussed in greater detail throughout this disclosure.

The one or more computing devices 110 can further include one or more interface ports 126, one or more communication units 128, and a system bus 130 that can communicatively couple the various features of the one or more computing devices 110 (e.g., the one or more interface ports 126, the one or more communication units 128, the one or more memories 118, and/or the one or more processors 116). The one or more interface ports 126 can connect the one or more input devices 119, output devices 111, sensors 107 and other ones of the one or more other vehicle electronic systems/devices 108, to the one or more computing devices 110. For example, the one or more interface ports 126 can include, a serial port, a parallel port, a game port, a universal serial bus ("USB") and the like.

The one or more communication units 128 can include suitable hardware and/or software that can facilitate connecting one or more external devices (discussed with FIGS. 3 and 6 below) to one or more computing devices 110 (e.g., via a wireless connection and/or a wired connection). For example, the one or more communication units 128 can be operatively coupled to the one or more external devices via one or more networks 114. The one or more networks 114 can include wired and/or wireless networks, including but not limited to, a personal area network ("PAN"), a local area network ("LAN"), a cellular network, a wide area network ("WAN", e.g., the Internet), and the like. For example, the one or more external devices can communicate with the one or more computing devices 110 (and vice versa) using virtually any desired wired or wireless technology, including but not limited to: wireless fidelity ("Wi-Fi"), global system for mobile communications ("GSM"), universal mobile telecommunications system ("UMTS"), worldwide interoperability for microwave access ("WiMAX"), enhanced general packet radio service (enhanced "GPRS"), fifth generation partnership project ("5G") communication system, third generation partnership project ("3GPP") long term evolution ("LTE"), third generation partnership project 2 ("3GPP2") ultra-mobile broadband ("UMB"), high speed packet access ("HSPA"), Zigbee and other 802.XX wireless technologies and/or legacy telecommunication technologies, near field communication ("NFC") technology, BLUETOOTH®, Session Initiation Protocol ("SIP"), ZIGBEE®, RF4CE protocol, WirelessHART protocol, 6LoWPAN (IPv6 over Low power Wireless Area Networks), Z-Wave, an ANT, an ultra-wideband ("UWB") standard protocol, and/or other proprietary and non-proprietary communication protocols. In this regard, the one or more communication units 128 can include software, hardware, or a combination of software and hardware that is configured to facilitate wired and/or wireless communication between the one or more computing devices 110 and the one or more external devices. While the one or more communication units 128 are shown for illustrative clarity as a separate unit that is not stored within memory 118, it is to be appreciated that one or more (software) components of the communication unit 128 can be stored in memory 118 and include computer executable components 150.

Figure 2:
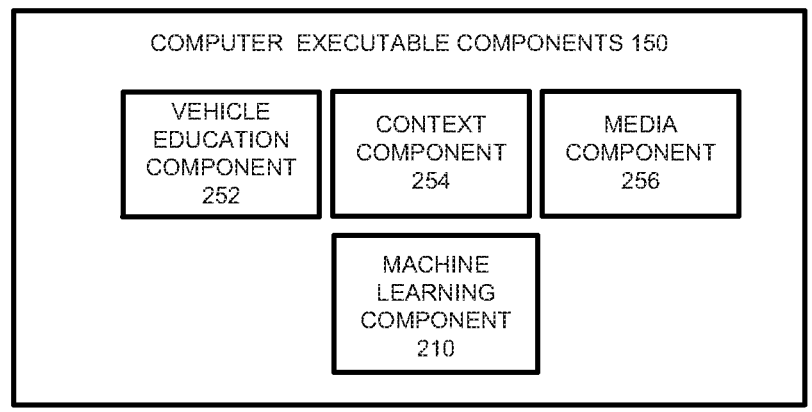
FIG. 2 illustrates a block diagram of an example, non-limiting system that can utilize computer executable components to facilitate providing educational media content items based on a determined context of a vehicle or driver of the vehicle, in accordance with one or more embodiments of the disclosed subject matter.

FIG. 2 illustrates a block diagram of an example, non-limiting system 200 that can utilize computer executable components 150 to facilitate providing educational media content items based on a determined context of a vehicle 120 or driver of the vehicle 120, in accordance with one or more embodiments of the disclosed subject matter. Repetitive description of like elements employed in other embodiments described herein is omitted for sake of brevity. The one or more computer executable components 150 can include, but are not limited to, machine learning component 210, vehicle education component 252, context component 254, and media component 256.

In one or more embodiments, system 200 can employ machine learning component 210 to facilitate the operations of context component 254, vehicle education component 252, and media component 256. For example, as described below, in one or more embodiments, context component 254 can determine a context of a vehicle or a driver of the vehicle, by employing at least one of, artificial intelligence or machine learning. In some embodiments, the artificial intelligence or machine learning can infer intent of the driver, and determine a context for content presentation based on this inferred intent, along with other information from sensor data or external sources.

One way that artificial intelligence or machine learning can assist the determination of a context of the vehicle or the driver for presentation is by using neural networks. One or more embodiments can employ one or more neural networks trained by data including, but not limited to, data from the operation of vehicle 120 by the current driver, data from the operation of other vehicles by the current driver, data from the operation of vehicle 120 by other drivers, data from the operation of other vehicles by other drivers, generated data, and other like sources. As discussed further with FIGS. 6 and 8A-B below, in one or more embodiments, sets of data used to train the one or more neural networks can include data from sensors 107, along with different results based on the data, and feedback on the results.

In an example of a context that can be determined by context component 254, vehicle sensor 107 can provide data indicating that vehicle 120 is navigating a sharp turn that can, considered without other factors, be a context for presentation where an explanation of the traction control components of vehicle 120 could be useful, e.g., media content items can be selected that can include, but are not limited to, explanations of the operation of the traction control system, benefits of this system in vehicle 120, comparison to traction control systems in other vehicles, enhancements to the system that can be added to vehicle 120, and other like information.

In other situations however, the same sample data from sensor 107 indicating a sharp turn can be a context where the presentation of media components could be distracting to the driver and unwelcome, e.g., not a context for presentation. To distinguish between these two circumstances, one or more embodiments can use artificial intelligence or machine learning techniques to infer the intent of the driver. For example, based on a neural network of sensor 107 data and other data (e.g., weather data) from other circumstances, context component 254 can infer the intent of the driver in this example circumstance.

For example, based on an inferred driver intent from additional data that can include clear weather data and the trained neural network, the sharp turn sensor data can be a context for presentation, e.g., one or more media content items, delivered at some time after, and in response to, the sharp turn, is predicted to be welcomed by the driver. One example circumstance where this welcome of media content presentation can occur is one where the driver executed the sharp turn with an intent to evaluate the performance of vehicle 120. Conversely, other driver intents can be inferred that indicate that presentation of media content items would be unwelcome to the driver, e.g., the driver intends to be extra attentive to the road during bad weather. As described further below, one or more embodiments can infer driver intent using a variety of artificial intelligence and machine learning approaches, and thus determine whether sensor 107 data and other data should be considered a context where media content items should be presented to the driver.

In one or more embodiments, vehicle education component 252 can perform a utility-based analysis in connection with selecting a media content item relating to a feature of the vehicle based on the determined context, the inferred driver intent and utility-based analysis. In one or more embodiments, the utility-based analysis can factor the cost of making an incorrect selection versus the benefit of making a correct selection. Like the analysis of driver intent described above, this utility-based analysis can be assisted by the use of neural networks, as well other artificial intelligence or machine learning techniques described with FIG. 8A below.

Returning to the sharp turn example described above, the utility-based analysis can weigh an estimated cost of an incorrect selection (e.g., ranging from the media content items being unwelcome by the driver to the media content item being distracting to the driver), compared to the benefits of media content items being presented (e.g., usefulness of information to the driver, enjoyment by the driver, and enhancement of safety that could come from awareness of information). In one or more embodiments, whether or not the inferred intent of the driver is indicative that presentation of media content items would be welcomed by driver, vehicle education component 252 can still, based on the utility-based analysis, prevent the presentation of the media content items. Additional details of the operation of context component 254 and vehicle education component 252 are discussed below.

For example, by monitoring factors including, but not limited to, the criteria used to the determination of contexts, and the success results determined from feedback and other sensors, machine learning component 210 can learn user preferences regarding information including, but not limited to, the relative importance of respective applications and/or functions in different contextual scenarios, the preferred times of media content item presentation, the preferred media content items to present, and other like information used to guide embodiments described herein. These learned preferences can be used by machine learning component 210 for processes including, but not limited to, determining and/or inferring what types of contexts to detect, how to detect different contexts, what types of media content items to select for presentation, when to present the selected media content items, and processes of other embodiments described herein.

Returning to the description of context component 254, in addition to the results of the sharp turn example above, this component can determine a context that can be a broadly or narrowly defined scenario that can indicate that some, but not all types media content items are unwelcome or welcome. For example, in between the two example conclusions detailed above (media content items welcome or unwelcome) there are a variety of modifications to the type, timing, and content of the media items presented that can, given the intent of the driver, indicate that a media content item would be welcomed by the driver, e.g., at some time interval after the turn, a shorter media content item would be welcome, but a longer one would be unwelcome, or some type of media content items are welcomed while others are unwelcome.

In the description below, context determining components of the system are further described. As noted above, one set of resources that can be used by one or more embodiments to determine contexts are vehicle sensors 107. As used herein, sensors 107 can broadly include sensors that can detect ambient physical information about the environment inside and outside vehicle 120 (e.g., accelerometer, thermometer), sensors that can detect physical attributes of the driver, sensors and analytics that can provide information about how the vehicle is being operated by the driver, and sensors associated with vehicle features, e.g., sensing operation of features of vehicle 120, including, the vehicle radio, the hazard lights, the seat belts, the glove compartment, fuel efficiency systems, safety systems, and other like vehicle 120 features. Different sensors and additional examples are provided below with the description of FIG. 4 below.

Another set of resources that can be used individually, or in combination with sensors 107 noted above, are facilitated by communication unit 128. As noted above, communication unit 128 can facilitate communication with information sources inside and outside of vehicle 120. In one or more embodiments, these information sources can be used by context component 254 to determine the context of vehicle 120 or a driver of vehicle 120, e.g., by retrieving road conditions, weather information, current location, and other like information. As discussed further with FIG. 4 below, communication unit 128 can be used to retrieve information, via networks 114, from computer server 180. It should be noted that, as used herein, computer server 180 can be one or more geographically dispersed computer servers, including, servers with information specifically formatted for retrieval by communication unit 128 and computer servers with information formatted in other ways, e.g., databases, web sites, and other data sources. In one or more embodiments, this external data, combined with sensor 107 data can also be used with artificial intelligence or machine learning techniques described herein, e.g., for training one or more neural networks to recognize contexts for presentation and perform utility-benefit analyses of content presentation.

Returning to the weather context example mentioned above, external information can be retrieved from computer server 180 based on different factors including, but not limited to, the present location of the vehicle, the speed of the vehicle, and estimated experience level of the driver, e.g., a context determined by one or more embodiments can be vehicle 120 on a road moving toward weather conditions (e.g., hazardous weather conditions) at a particular speed. Based on this determined context, vehicle education component 252 can present one or more selected media content items at selected times, e.g., by employing media component 256 and output devices 111 of vehicle 120.

Returning to the description of vehicle education component 252 that can perform the utility-based analysis in connection with selecting the media content item, in between the two example conclusions detailed above (e.g., media content items welcome or unwelcome) there are a variety of modifications to the type, timing, and content of the media items presented that can, given the intent of the driver, indicate that a media content item would be welcomed by the driver, e.g., at some time interval after the turn, a shorter media content item would be welcome, but a longer one would be unwelcome, or some type of media content items are welcomed while others are unwelcome. To address these possible results, in one or more embodiments, context component 254 can determine, based on the inferred intent of the driver, and the sensor and other data analyzed, that some type of media content item can be welcome to the driver. Based on the context information provided by context component 254, vehicle education component 252 can select media content items having, as discussed below, different characteristics that include, but are not limited to, type of media content item, content of media content item, length of media content item, time to present media content item (e.g., interval after triggering event, vehicle 120 stopped or moving, and other like characteristics).

Types of media content items that can be selected by one or more embodiments include, but are not limited to, audible media content items (e.g., spoken descriptions and instructions, and sound effects) and visual media content items (e.g., video and still images, lights that directly or indirectly highlight different features of vehicle 120). Examples of the content of selected media content items are discussed with examples below.

In addition to audible and visual media content items, one or more embodiments can also use tactile outputs as a type of media content item, e.g., information provided by vibrations, variable surfaces that can be sensed by touch, and other feedback mechanisms. These types of output are already used in some vehicles to provide safety and energy savings information to a driver, e.g., respectively in a steering wheel during a potentially unsafe lane change, and in an accelerator pedal to discourage inefficient acceleration practices. As described further below, one or more embodiments can use existing vehicle systems and other systems to output media content items (e.g., information) to one or more occupants of vehicle 120.

Selecting and outputting media content items (e.g., by vehicle education component 252 and media component 256) can be based on additional factors including a likelihood that a media content item can be helpful for the determined context and the urgency of the context. Like the other determinations described above, a determination of a likelihood of usefulness by a driver can be assisted by the artificial intelligence and machine learning techniques described herein, e.g., by using one or more neural networks.

Features that can be selected by vehicle education component 252 based on a context determined by context component 254 can broadly include any characteristic of the operation of vehicle 120 (e.g., driving in winter weather), any physical part of vehicle 120 (e.g., controls, surfaces).

In an example, based on the moving status of the vehicle, and the windshield wiper controls being primarily accessible by the driver of the vehicle, a media content item can be selected that is an audible description of how to activate the windshield wipers. In additional embodiments, other media content items can be output to combine with the audible description that can improve the explanation of the audible media content item. For example, the audible description can reference a location in the vehicle where the windshield wiper controls are located, and to emphasize the area, a vibrating component in the steering wheel near the controls can be activated at the same time as the description. Additional examples of the selection of media content items by one or more embodiments are included below with the discussion of contexts that can be determined by one or more embodiments.

Further, machine learning component 210 can utilize feedback regarding the media content item selected for the content by vehicle education component 252 and the output device selected for output by media component 256. In addition to a pattern detection approach described above, machine learning component 210 can apply occupant preferences to the media content item selected based on a different context. For example, media content items presented along with feature light 309 illumination of particular features can be consistently rated higher by occupants of vehicle 120. Thus, in some circumstances, an individual element of one or more embodiments (e.g., feature light 309 illumination) can improve the operation of one or more embodiments by being used more frequently. It should be noted that, this result can be achieved without having to receive feedback on many individual elements of embodiments, e.g., use of feature lights 309, a particular volume of audio output, a particular brightness of display, etc., need not be individually rated by occupants because patterns can be detected by machine learning component 210.

In one or more embodiments, after the selection of media content items by vehicle education component 252, media component 256 can select from one or more ways of outputting media content items, based on factors that can be specific to the context, the media content item, and/or the status of vehicle 120. For example, ways of outputting media content items based on context where vehicle 120 has a context that includes, but is not limited to, parked, stopped, being driven at different speeds, and/or during different driving conditions, e.g., time of day, weather, and the like. In one or more embodiments, media component 256 can be enabled to output the selected media content item by employing one or more output devices 111. For example, processor 116, when executing the media component 256 computer executable component 150, can access different output-capable components that are communicatively coupled to interface ports 126.

As discussed in examples below, the selection and output of one or more selected media content items can be a process that integrates considerations of safety, efficacy of the media content items in being helpful to one or more occupants of vehicle 120, estimated urgency of the need for output of the media content item, and other beneficial considerations.

For example, when a visual media content item for a driver of vehicle 120 is selected by vehicle education component 252 based on a determined context, when vehicle 120 is not stopped, media component 256 can determine, based on an urgency level of the context to forego displaying the visual media content item until vehicle 120 is stopped. Instead an alternate audio version of the visual media content item can be output or only the audio track of the visual component can be output. In an alternate embodiment, vehicle education component 252 can, based on the vehicle not being stopped, output only the audio track of the selected visual media item or select from alternative media content items, e.g., audible-only media content items, tactile outputs, etc. Other examples of different contexts and factors evaluated by one or more embodiments for the display of selected media content items are discussed further below. For example, media component 256 can also select from different output devices based on different factors, and these can also be used to select media items for output.

In one or more embodiments, media content items can be selected based on an estimates of context elements with differing levels of accuracy. For example, for the selection and presentation of comfort adjustment settings for larger drivers noted above, accurate measurements may not be required, while for embodiments also discussed above, e.g., where settings are provided for the adjustment of different setting, a higher level of accuracy provide more useful information, in some contexts.

Figure 3:
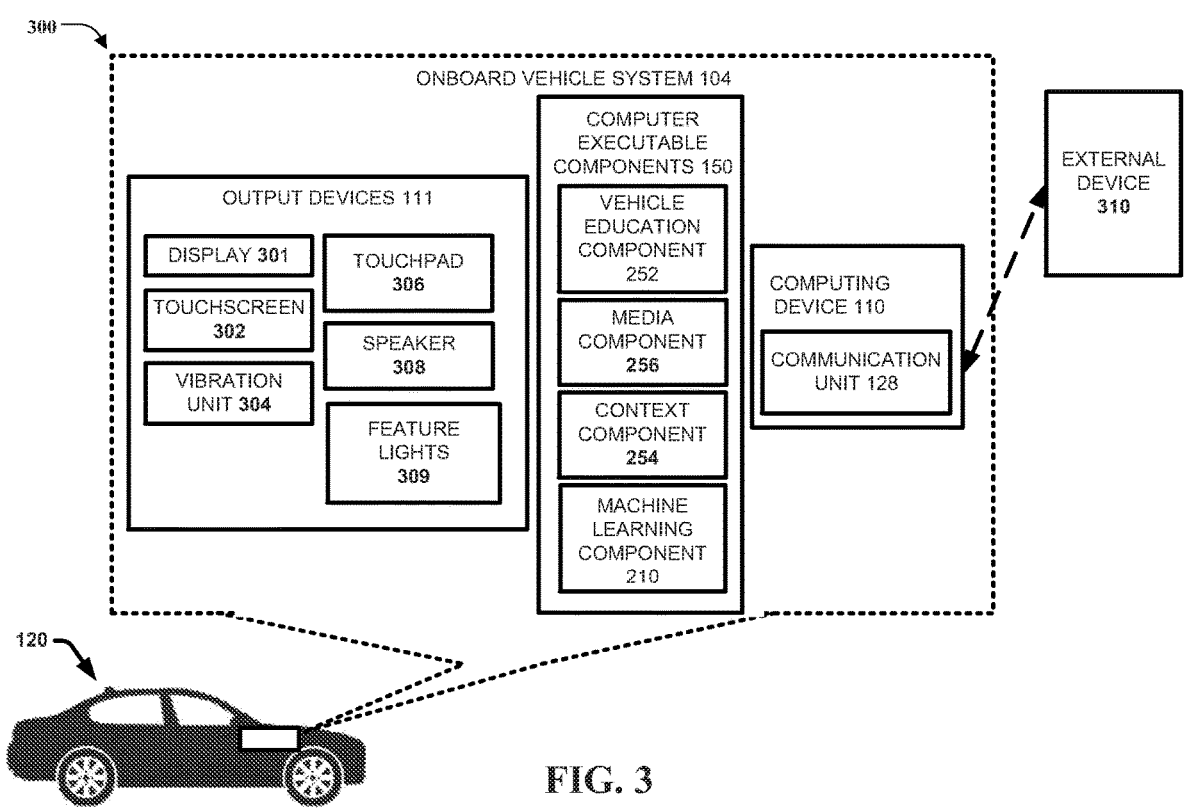
FIG. 3 illustrates a block diagram of an example, non-limiting system that can utilize computer executable components to facilitate providing by different output devices, educational media content items based on a determined context of a vehicle or driver of the vehicle, in accordance with one or more embodiments of the disclosed subject matter.

FIG. 3 illustrates a block diagram of an example, non-limiting system 300 that can utilize computer executable components to facilitate providing by different output devices 111, educational media content items based on a determined context of a vehicle or driver of the vehicle, in accordance with one or more embodiments of the disclosed subject matter. Repetitive description of like elements employed in other embodiments described herein is omitted for sake of brevity.

As noted above, media component 256 can use a variety of output devices in vehicle 120, e.g., output devices 111, that can include, but are not limited to display 301, touchscreen 302, vibration unit 304, touchpad 306, speaker 308, and feature lights 309. In addition to the considerations discussed above for the selection of media content items (context determined, status of vehicle, and urgency), in one or more embodiments, output devices can be selected based on factors that are specific to the context and the status of a driver of vehicle 120, e.g., whether the driver is presently driving vehicle 120, as discussed with FIG. 5 below, the experience level of the driver, and the like. As discussed further with FIG. 5 below, driving behavior of a driver of vehicle 120 can be evaluated by one or more embodiments, and also be considered in the context determination, content selection, and content delivery activities of one or more embodiments.

As described herein, media content items can include, but are not limited to, video content, still image content, and audio content. For example, output devices 111 (e.g., display and touchscreen, discussed with FIG. 4 below) can be used to output video content and still image content, e.g., as combinations of videos and images. Speaker 308 (e.g., one or more speakers) can output audio content. In another approach to audio and/or video output that can be utilized by one or more embodiments, can utilize the capabilities of external device 310 to output media content items. For example, communication unit 128 can be communicatively coupled to an external device and send media content items to external device 310 for output. External devices 310 that can be used by one or more embodiments can include, but are not limited to, tablet devices, mobile phones, and smart watches. As described below with FIG. 4, external devices 310 can also be utilized by one or more embodiments to facilitate the determination of different contexts using the sensors included in external devices 310, e.g., accelerometer, light sensor, magnetometer, and the like.

Media content items selected by one or more embodiments can additionally include output by one or more feature lights 309, these being lights configured to illuminate different features of vehicle 120. In one or more embodiments, feature lights 309 can be embedded in vehicle 120 features, and light up at particular times, e.g., a light emitting diode (LED) can be affixed to a control button on the steering wheel of vehicle 120 and when a media content item includes highlighting a feature of the control button, this light can be illuminated. In an additional and/or alternative embodiment, an illuminating feature light 309 inside vehicle 120 can be placed to directly illuminate one or more features. As with one or more of the other output devices discussed herein, feature lights 309 can be used by one or more embodiments, individually, or in combination with the presentation of other media content items by other output devices, e.g., lights illuminating a steering wheel control while an audible description is played of the illuminated control.

Returning to the windshield wiper control example above, in an example use of feature lights 309, one of more embodiments of vehicle education component 252 can select an illumination of the windshield wiper control by a mounted (e.g., recessed) feature light 309 aimed at the feature control. Alternatively, this mounted feature light 309 can be mounted such that its aim can be changed to be directed at different features, as needed by one or more embodiments. In another embodiment, one or more feature lights 309 can be a laser that can be adjusted to identify different features of vehicle 120. Further, vehicle education component 252 can determine to select a feature light 309 based on the time of day and/or ambient light in the interior of vehicle, e.g., as detected by an example sensor 107 that can detect ambient light. Additional examples of additional locations for feature lights 309 and ways feature lights 309 can be combined with other media content items are discussed further below.

Media content items (e.g., information highlighting features of vehicle 120) can also be delivered by different approaches that are sensed by different non-hearing or seeing senses, including touch, e.g., vibration and variable textures. Returning to the windshield wiper control example, a vibration unit can be placed such that one or more controls of vehicle 120 are subject to vibration, e.g., providing another approach to identifying controls that can be use alone, or in combination with other aspects of one or more embodiments. As with many of the combination approaches discussed herein, combinations of media content items outputted by media component 256, can provide, in some circumstances, a more informative and engaging response than an approach that only uses individual media content items.

Figure 4:
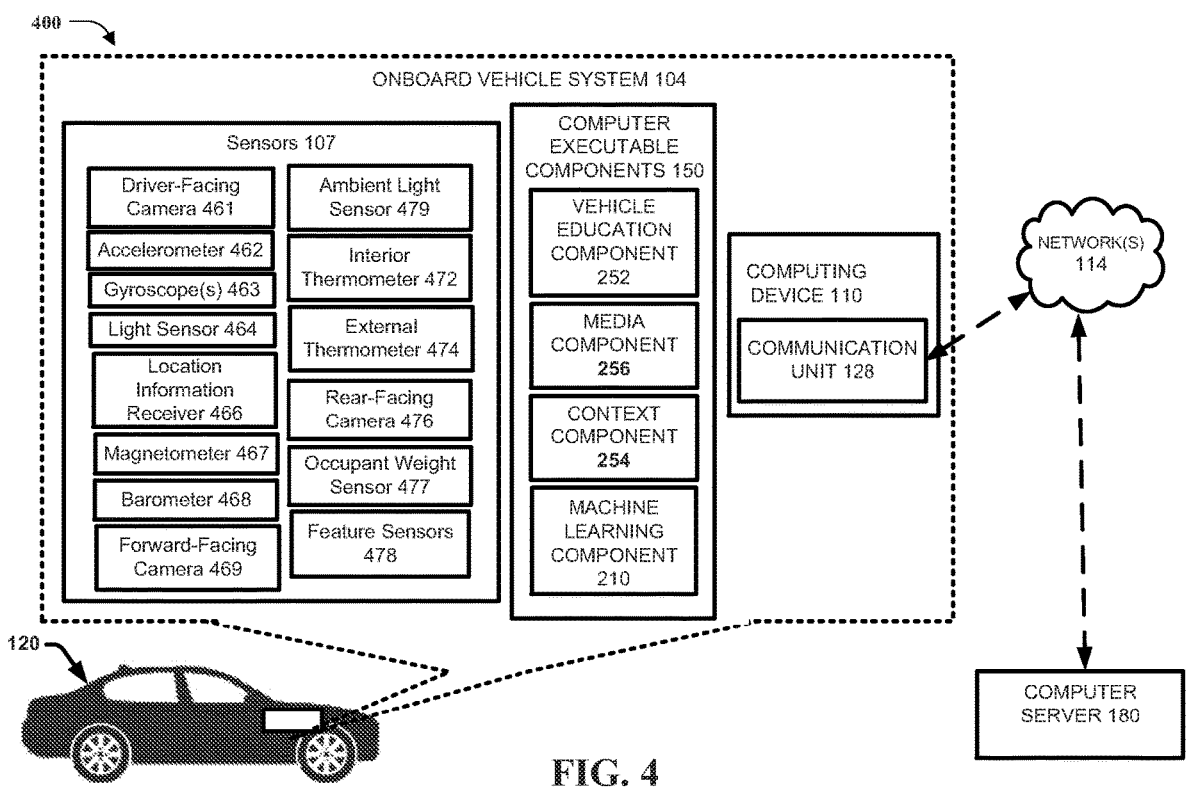
FIG. 4 illustrates a block diagram of an example, non-limiting system that can utilize computer executable components to facilitate providing educational media content items based on a context, determined by one or more sensors, of a vehicle or driver of the vehicle, in accordance with one or more embodiments of the disclosed subject matter.

FIG. 4 illustrates a block diagram of an example, non-limiting system 400 that can utilize computer executable components 150 to facilitate providing educational media content items based on a context, determined by one or more sensors 107, of a vehicle 120 or driver of the vehicle 120, in accordance with one or more embodiments of the disclosed subject matter. Repetitive description of like elements employed in respective embodiments is omitted for sake of brevity.

Communication unit 128 from FIG. 1 is depicted in FIG. 4, along with networks 114 and computer server 180. As described herein, media content items can be selected by vehicle education component 252 and output by media component 256. In one or more embodiments, vehicle education component 252 can select from media content items that have been downloaded from computer server 180 via networks 114. In some embodiments, media content items can be selected by vehicle education component 252 for download and storage (e.g., in memory 118) before the media content items are needed for output. This storage of media content items locally can, in some circumstances, reduce the time from a context being determined and the selected media content item being ready for output. In the test drive example, because the media content items presented can be from a specific group of promotional media content items, in one or more embodiments, these can be selected for download in advance of the commencement of the test drive. Another benefit of pre-drive downloading of media content items is that, in some circumstances, a faster network (e.g., wifi) can be used to download potentially large media content items, as compared to the wireless cellular connectivity that can be used during the test drive. In an additional or alternative embodiment, media content items can be downloaded on demand from an external source, e.g., computer server 180, this being an approach that can work without other approaches, or that can be used to supplement the local storage approach described above.

Continuing the discussion of FIG. 4, to illustrate sample sensors 107 that can be used to determine the context of the vehicle or the driver of the vehicle, sensors 107 can include example sensors 107 that can be used by embodiments to determine, e.g., by training one or more neural networks, contexts of vehicle 120 and/or an occupant of vehicle 120.

In one or more embodiments, sensors 107 can include typical vehicle sensors, as well as sensors specifically designed to collect data for one or more embodiments described herein. For example, sensors 107 can include, but are not limited to, driver-facing camera 461, accelerometer 462, gyroscope 463, light sensor 464, magnetometer 467, barometer 468, forward-facing camera 469, interior thermometer 472, external thermometer 474, rear-facing camera 476, occupant weight sensor 477, feature sensors 478, and ambient light sensor 479.

As noted with the discussion of FIG. 2 above, many of the sensors 107 utilized by one or more embodiments, can and may primarily be used for, providing sensor data for other purposes associated with vehicle 120. For example, in addition to the examples provided above, a driver facing camera 461 can be located in front of the driver to provide data that can facilitate the detection of driver drowsiness, accelerometer 462 can be used to detect the need to deploy vehicle airbags, and an occupant weight sensor 477 can be used to determine whether to enable the deployment of airbags for a seat. In these examples, in addition to these purposes, one or more embodiments can also use these sensors 107 to determine a context of the vehicle or a driver of the vehicle, for use with one or more embodiments described herein. For example, as discussed with FIG. 5 below, driver facing camera 461 and occupant weight sensor 477 can be used to estimate physical characteristics of a driver of vehicle 120, and accelerometer 462 can be used to measure driving behavior.

In addition to the sensors 107 discussed above, it should be appreciated that one or more features of vehicle 120 can have associated sensors that can provide data to components of one or more embodiments, e.g., computer executable components 150 executed by processor 116. For example, as discussed above, one or more embodiments can determine a context where it is raining, but the windshield wipers of vehicle 120 have not been activated. One approach that can be used by one or more embodiments to determine that the windshield wipers have not been activated is to have a sensor configured to detect the activation of this feature, e.g., a pre-existing sensor in vehicle 120 or a sensor installed in vehicle 120 to provide data to one or more embodiments. In an alternative embodiment, instead of utilizing an installed sensor, one or more embodiments can use temporarily placed sensors, e.g., for particular events. For example, as noted above, one or more embodiments can be utilized to provide educational media content items during a test drive of vehicle 120 by a driver unfamiliar with the controls of vehicle 120. In this example, temporary sensors can be placed to monitor particular features, so as to provide context data for the assistance of this driver. These temporary sensors can also be used with temporary output devices 111, similarly placed. It should be noted that almost every feature of vehicle 120 can have an associated sensor that can provide feature usage data to one or more embodiments.

In addition to, as noted above, one or more embodiments being able, in some circumstances, to determine contexts by sensors 107 inside vehicle 120, it should also be appreciated that one or more embodiments can determine context by utilizing data received from sources external to vehicle 120, e.g., by employing communication unit 128 to receive information that can be used on its own, or to supplement other information available to embodiments. For example, communication unit 128 can employ a location information receiver 466 component that can receive location information corresponding to a geographic location of vehicle 120. This location information can include, but is not limited to satellite navigation system information, e.g., global positioning system (GPS) data, and other similar systems. Alternatively, other approaches to determining the geographic location of vehicle, including using other types of radiolocation and receiving entry of a location from input devices 119.

As described further below, in one or more embodiments, this geographic location, used alone or in combination with other data, can facilitate the determination of a variety of contexts. In one or more embodiments, data collected by other drivers in the geographic location can be used to train one or more neural networks to generate predictions of intent and perform utility-based analyses for contexts occurring in this geographical area.

As noted above, another data resource available via communication unit 128 that can be utilized by one or more embodiments is the retrieval of data from external sources via a network connection, e.g., from computer server 180 via networks 114. As discussed further below, a variety of information that can be useful in determining different contexts can be accessed and used either individually, or in combination with other retrieved data or sensor data, to enable one or more embodiments to determine different contexts, by combining the geographic location discussed above with data about a particular location. For example, as discussed with FIG. 9 below, weather information for a particular location can be used to determine a context of hazardous driving conditions. Additionally, in another example, data that a weather forecast indicates icy conditions can be combined with sensor data from feature sensors 478 that indicates a driver is repeatedly engaging the brakes of vehicle 120 instead of letting the anti-lock braking systems (ABS) work to slow the vehicle. In this determined context, vehicle education component 252 can select media content items that describe the current conditions and explain how the ABS features of vehicle 120 can be advantageously used for safer braking. Other data that can be retrieved from computer server 180 and used by one or more embodiments are discussed below, e.g., with the description of FIG. 9, one or more embodiments are described as using information about a road traveled on by vehicle 120 to determine different contexts. In one or more embodiments, one or more neural networks of machine learning component 210 can be periodically updated based on external data from other drivers using different roads, this data being received, e.g., from communications unit 128.

In another example that illustrates ways that one or more embodiments can use data received via networks 114 from outside vehicle 120, a context determined can be a test drive of vehicle 120 by a driver that is unfamiliar with the controls of vehicle 120. Examples of test drives can include drives to evaluate vehicle 120 with or without additional guidance (e.g., by another occupant) available. By providing context sensitive information about vehicle 120 during the test drive, one or more embodiments can supplement or replace other sources of vehicle 120 information, including, but not limited to, other occupants familiar with the vehicle and media materials provided to the driver after the test drive.

Another type of information that can be retrieved from computer server 180 is the media content items presented by one or more embodiments (e.g., audible descriptions of cruise control and adaptive cruise control). In an example, media content items available for selection can have been preloaded by one or more embodiments based on different conditions. For example, during a test drive context a driver evaluating vehicle 120 can require usefulness descriptions of different features, while in other contexts, such as the short-term access vehicle context noted above, can require different messages. In these different situations, collections of content items selected for each situation can be preloaded in vehicle 120 for use by one or more embodiments. Further, in any context, features can be selected that are available in the particular vehicle 120 driven, and in the test drive context, options packages specific to vehicle 120 can also be pre-loaded. In an alternative embodiment, media content items can be available for selection from computer server 180 and downloaded as needed by one or more embodiments. In other alternatives, a combination of the two approaches can be employed.

Continuing the test drive example, to provide additional accuracy for the contexts determined by one or more embodiments, because in this example, selected context items are directed providing helpful, contextual information to the driver, before commencing the test drive, information about the driver can be provided to onboard vehicle system 104, e.g., features of vehicle 120 in which the driver is interested, and the experience level of the driver with vehicle 120. In alternative embodiments discussed below with FIG. 5, one or more embodiments can use sensed driving behavior and operation of feature controls to determine the level of experience of the driver. In another alternative embodiment, onboard vehicle system 104 can query the driver for experienced level before or during the drive, e.g., by employing touchscreen 302 or external device 310 discussed above.

For example, in a context where it is determined that a driver cannot locate a feature (e.g., a cruise control button on the steering wheel of vehicle 120 while driving at freeway speeds), this context can be determined by context component 254, and one or more media content items can be selected. In this example, because the determined context includes the driver operating vehicle at freeway speeds, one media content item selected can be an audible description of where the cruise control enabling button is located, e.g., on the steering wheel. Further, this audible description can be adapted to an estimated experience level of the driver.

Further, this audible description can combine an informative message with a message that describes the usefulness of a feature and benefits of the feature as compared to other ways to implement the feature. The description in the latter of the usefulness and benefits of a feature can be employed based on the context determined, e.g., during a test drive, where features are evaluated compared to alternatives implementations of features. Thus, in this example, an audible message can be outputted that states that the cruise control button is on the middle right of the steering wheel, and in addition, the cruise control has useful adaptive cruise control features that can provide additional benefits as compared to a traditional cruise control. Returning to the informative message, one or more embodiments can further include a description of how to locate the adaptive cruise control features and how the feature can be configured and enabled. Further, one or more embodiments can use colloquial statements that invite the driver to, if safety permits, try out the feature.

In a variation of the example where an upgraded version of the adaptive cruise control is available, but not implemented in vehicle 120, this available upgrade can be described by a media content item, and feature option packages can also be described. One having skill in the art, given the descriptions herein, would appreciate the different combinations of contexts detected, features generally explained, feature benefits highlighted, and upgraded optional features presented, that can be enabled by one or more embodiments. In one or more embodiments, to provide helpful information to the entity that has provided vehicle 120 for evaluation, records of interactions between the driver and onboard vehicle system 104 can be provided, including, but not limited to, features described, option packages presented, and an estimated driver interest in particular features as manifested, for example, in a number of times the feature or related features were subject to an inquiry by the driver.

Generally speaking, one or more embodiments can be configured to provide differing levels of detail about contexts determined, media content items presented, and responses elicited from the driver. These details can, in some circumstances, provide useful information for configuring embodiments, e.g., instructions given by one or more embodiments may not have enabled the driver to locate the feature described. Further, detailed descriptions of option packages presented and estimated interest in different features can be useful to proceed to additional activities, e.g., based on the record of the test drive of vehicle 120, different vehicles can be selected for evaluation, or vehicle 120 can continue to be selected.

It is important to note that one or more of the examples and embodiments described below can also be used in the test drive context described above. For example, FIG. 9 below describes responses by one or more embodiments to different road conditions encountered during a drive. When different types of road conditions occur (e.g., road conditions that relate to features of vehicle 120) in the test drive context, one or more features of vehicle 120 can be described to the driver that relate to the road features.

Continuing this example and returning to the discussion of combinations of traditional and non-traditional media content items, in the locating of the cruise control example discussed above, additional types of media content items can be employed by one or more embodiments. For example, in an implementation, the button searched for by the driver could also be vibrating, e.g., at an intensity selected based on safety principles. Further, additionally or alternatively, a light embedded in the button can be illuminated as the audio description is being outputted. Further, additionally or alternatively, a focused light or laser can be directed to highlight the button sought. Further, based on the complexity of the instructions that are estimated to be helpful to the driver, given the determined context, one or more embodiments can provide a suggestion that vehicle 120 be stopped so additional visual media content items can be outputted, e.g., a video of the instructions. Further, based on location information discussed with FIG. 5 below, this suggestion by embodiments to pull over can reference a specific location (e.g., parking lot or freeway rest stop) in which to stop vehicle 120.

One having skill in the relevant arts, given the description herein of the broad variety of context determining components that can be utilized by one or more embodiments, will appreciate additional types of sensors 107, inputs, network information sources, etc., that can be utilized by one or more embodiments to output media content items based on determined contexts.

Figure 5:
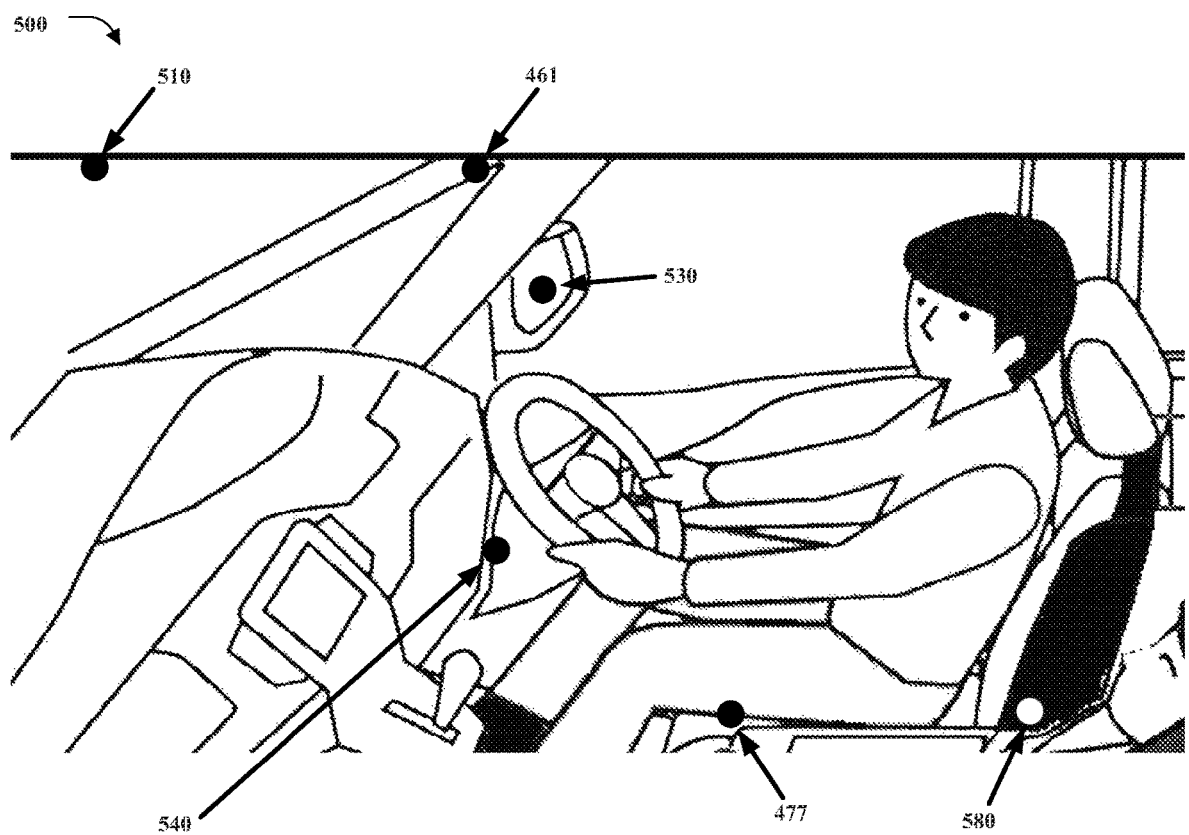
FIG. 5 illustrates a diagram of an example, non-limiting vehicle interior that can facilitate the determination of physical attributes of a driver as a context for providing educational media content items related to the physical attributes, in accordance with one or more embodiments of the disclosed subject matter.

FIG. 5 illustrates a diagram of an example, non-limiting vehicle interior 500 that can facilitate the determination of physical attributes of a driver as a context for providing educational media content items related to the physical attributes, in accordance with one or more embodiments of the disclosed subject matter. Repetitive description of like elements employed in respective embodiments is omitted for sake of brevity.

In one or more embodiments, a context that can be determined by one or more embodiments includes physical attributes of a driver of vehicle 120, determined, for example, by context component 254 based on information received from sources including, but not limited to, one or more sensors 107, other sensors in vehicle 120, information stored on computer server 180 retrieved by communication unit 128.

An example sensor 107 that can be used to determine physical attributes of an occupant of vehicle 120 is occupant weight sensor 477 in the driver's seat of vehicle 120. For example, the weight of the driver can provide an indication of whether the driver may need comfort adjustment features of the driver's seat in vehicle 120. An example context than can be determined based on this information is that the driver is larger than a particular threshold weight. This larger driver context can be used by vehicle education component 252 to select media content items describing different vehicle 120 features that can improve comfort for the driver, e.g., memory seat adjustment, steering wheel tilt, seat belt adjustment, and other like features.

In this example, based on a context determination of the driver being larger or smaller than average, one or more embodiments can select for output, at the time a driver is estimated to be entering vehicle 120 (e.g., after the driver's door is opened) a video that describes the various features that enable vehicle 120 to be adapted to increase the comfort of a driver, e.g., seat adjustment, steering wheel adjustment settings, seat belt settings, and other like features. Further, the media content item output can be customized to suggest settings customized for this particular driver, based on information from occupant weight sensor 477 and other sensors 107. In this example, as described above, vehicle education component can consider the urgency of the context, the status of vehicle 120, and the complexity of the instructions, when selecting a media content item for presentation. For example, because there can be many types of adjustments to driver-oriented cabin features, a video media content item can be selected and, because of the visual media content item and an urgency level that can allow delay in presentation, media component 256 can delay presentation of this educational information until vehicle 120 is stopped for a longer period of time.

Further to the use of occupant weight sensor 477, as noted above, one or more embodiments can combine sensor 107 data with other sensors to determine more specific physical attribute information for context determination. For example, rearview mirror angle sensor 510 and side-mirror angle sensor 530 can provide angle measurements of how these components have been adjusted by the driver for use while driving. Using an estimated distance between the angle adjustment axis and the eyes of the user, the adjusted angles of one or both of rearview mirror angle sensor 510 and side-mirror angle sensor 530 can estimate a point in space where the eye-level of the driver is located. Based on this estimated eye-level location, and the known location of the driver's seat, one or more embodiments can estimate the sitting height of the driver. This height can be further used to select content (e.g., for a driver with that sitting height) as well as customized settings that can be provided along with the content. In alternative embodiments, information described as retrieved by communication unit 128 from sources external to vehicle 120 can also be retrieved from storage inside vehicle 120.

Using the sitting height determined above, combined with the driver's weight determined in the previous example and information retrieved by communication component 128 (e.g., size metrics for a population of a region), a total height may be able to be determined as well. It should be noted that the above example provides approaches that can be used in detection of many of the contexts described herein, e.g., combining several sensors of different types (e.g., a weight sensor and an angle sensor), with information received from outside of vehicle 120 to estimate a context of the driver that has not been directly measured (e.g., the height of the driver estimated based on weight and the adjusted angles of driving mirrors).

Continuing this example, additional sensors that can, used individually or in combination with other sensors discussed herein, provide context information for physical characteristics of vehicle occupants include, but not limited to, driver-facing camera 461 (e.g., providing data for the determination of height), steering wheel sensor 540, and seat tilt angle sensor 580, e.g., providing angle information that can inform context component 254 in ways similar to rearview mirror angle sensor 510 and side-mirror angle sensor 530 discussed above.

One or more embodiments can, as described below, in addition to detecting a context based on physical characteristics of an occupant of vehicle 120, determine a context relating to driver operation of vehicle 120. For example, in one or more embodiments, data from accelerometer 462 can detect different aspects of the operation of vehicle 120, including, but not limited to, rapid acceleration or deceleration, and whether vehicle 120 is traveling over bumpy terrain. One or more embodiments can detect the above contexts over time, and in combination with other sensor information, e.g., speed of vehicle 120. Thus, in an example, one or more embodiments can detect a context where vehicle 120 is operated at a faster than a suggested speed over bumpy terrain.

Based on this determined context, a media content item can be selected that relates to a feature of the vehicle for adapting to the determined driver operation context. Example media content items that can be selected based vehicle 120 operation faster than recommended over terrain include, but are not limited to, audio content to explain the speeds suggested and how to enable different vehicle features that can mitigate bumpy terrain, a video played while the vehicle is stopped that explains vehicle systems designed to handle bumpy terrain, and specific suggested speeds for recent bumpy road segments. In an alternative or additional approach, media content items can be selected that describe upgrades to the equipment of vehicle 120 that can increase the safety of the operation, e.g., off-road equipment.

In addition to narrowly focused contexts (e.g., driving at a safe speed over bumpy terrain discussed above), one or more embodiments can be configured to determine events associated with one or more vehicle operation goals. Once selected, the one or more selected vehicle operation goals can be used, for example, by one or more embodiments to detect contexts and select media content items based on the contexts, to highlight features of vehicle 120 that can further the goal. In one or more embodiments, vehicle operation goals can include, but are not limited to, fuel efficient driving, safe driving, and driving with less pollutants generated. In an example, when the fuel efficiency vehicle operation goal is selected, one or more embodiments can determine contexts that can be used to coach vehicle operation towards the goal, e.g., rapid acceleration, idling for long periods of time, and carrying heavy loads. When a context is determined that does not further the goals selected (e.g., a pattern of rapid accelerations from a stop), this context can cause vehicle education component 252 to select media content items that describes different vehicle features that can reduce rapid starts (e.g., configuring the transmission of vehicle 120 to an energy efficient mode), along with an explanation of the benefits of using the described feature. Conversely, when a context is determined that is in furtherance of the selected goals (e.g., turning off the vehicle after idling for a short time), media content items can be selected that acknowledge the driving behavior, and highlight vehicle features that could also be in furtherance of the goal.

The examples above can be examples of a driver with familiarity with the operations of vehicle 120. One or more embodiments can determine this familiarity in different ways, including, but not limited to, analysis of patterns of using different controls of vehicle 120, e.g., a driver getting into vehicle 120 at night and immediately activating the headlights and the media system of vehicle 120 can indicate a familiarity with the vehicle. In an alternate example, a driver getting into vehicle 120 and immediately adjusting the rearview mirrors, engaging vehicle 120 actions when not required (e.g., engaging a turn signal before the headlights are activated), can indicate a driver with less familiarity with vehicle 120. In alternate embodiments, different driver characteristics can be input into onboard vehicle system 104 manually, by processes including, entry using touchscreen 302, by voice recognition, or from a data source external to vehicle 120. Example additional driver characteristics can include level of driving experience generally, and different types of driving with which the driver is familiar, e.g., night driving, off-road driving, freeway driving, and the like. It should be noted that, based on the analysis of patterns over time to determine familiarity, in some embodiments, this process can be performed by machine learning components, e.g., discussed with FIGS. 4 and 8A-8B.

In one or more embodiments, context component 254 can determine contexts based on the estimated familiarity with vehicle 120 described above. For example, while a normal driving at night context for an experienced driver may not be cause for vehicle education component to select and output an educational media content item about night driving, for a driver that is unfamiliar with the operation of vehicle 120, this context can cause selection of media content items that explain different features of vehicle 120 that can help the driver adapt to the circumstances, e.g., the location of lighting controls and the systems of vehicle 120 that can identify nighttime hazards, e.g., large animals on the road.

In the test drive example discussed above, one or more characteristics of the driver can be used to identify different features of vehicle 120 that could be helpful in different situations. For example, in setting up the test drive the driver can identify different interests that can be uploaded into onboard vehicle system and used to select media content items for output before, during, and/or after the drive. Further, during the test drive, when different contexts are determined, different features of vehicle 120 can be described by media content items, e.g., when vehicle 120 is driven around a sharp curve, the traction control system of vehicle 120 can be described. Additional aspects of a test drive that can be addressed by one or more embodiments are discussed further below.

In the short-term access vehicle 120 example discussed above, an estimated familiarity of the driver with operation of vehicle 120 can be used to select media content items for presentation. In one or more embodiments, the determined context can be a determined driver familiarity with a model type of the short-term access vehicle, and selected media content items can relate to features of the short-term access vehicle, as well as present driving conditions.

In an additional embodiment, context component 254 can detect that vehicle 120 has been rendered inoperative, e.g., because of a flat tire or a radiator leak. Based on this context, vehicle education component 252 can select an instructional media content item that can explain how to remedy the conditions, and/or different phone numbers can be provided for assistance.

Figure 6:
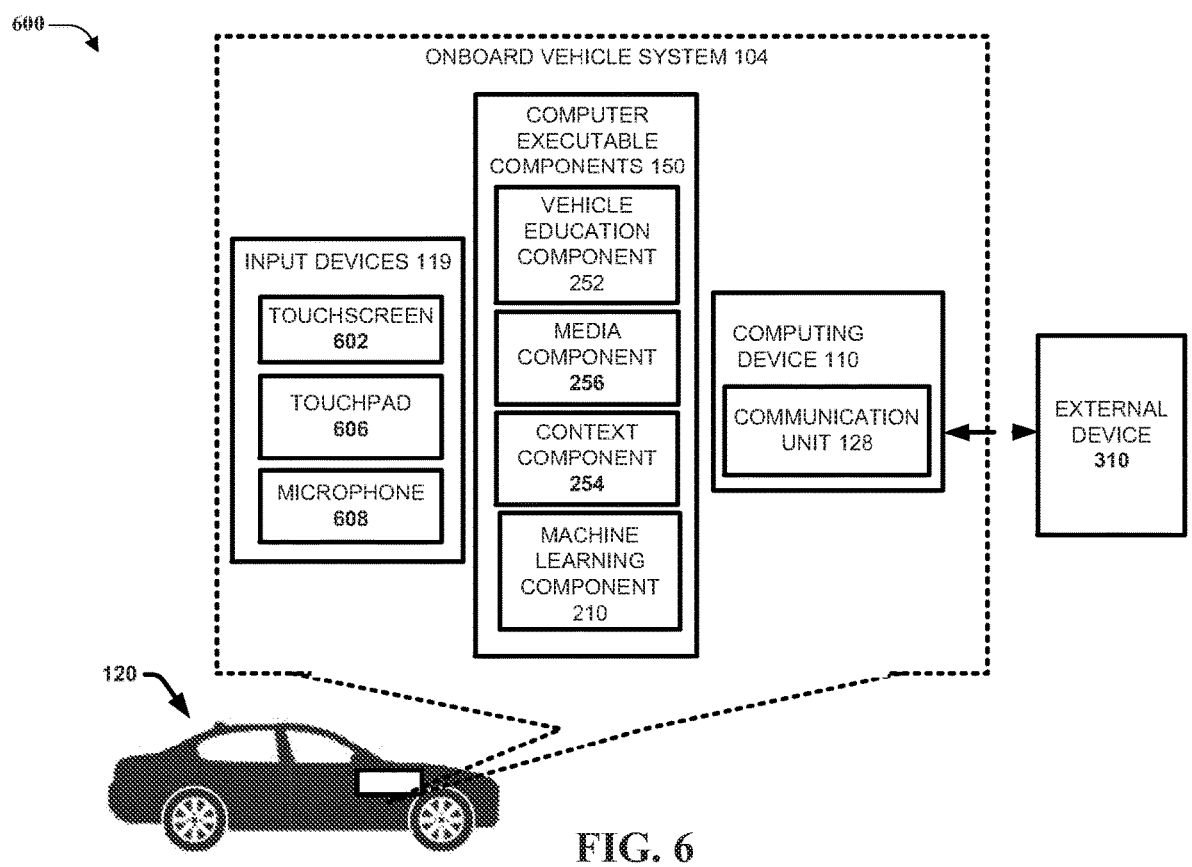
FIG. 6 illustrates a block diagram of an example, non-limiting system that can utilize computer executable components to facilitate the receiving of input associated with the providing of educational media content items based on a context of a vehicle or driver of the vehicle, in accordance with one or more embodiments of the disclosed subject matter.

FIG. 6 illustrates a block diagram of an example, non-limiting system 600 that can utilize computer executable components 150 to facilitate the receiving, by input devices 119 (e.g. touchscreen 602, touchpad 606, and microphone 608), input associated with the providing of educational media content items based on a context of a vehicle 120 or driver of the vehicle 120, in accordance with one or more embodiments of the disclosed subject matter. Repetitive description of like elements employed in respective embodiments is omitted for sake of brevity.

In one or more embodiments, display 301 can be, or include the touchscreen 302. With these embodiments, the touchscreen can serve as both an output display device and an input device for onboard vehicle system 104. The touchscreen can comprise suitable hardware that registers input events in response to touch (e.g., by a finger, stylus, gloved hand, pen, etc.). The type of the touchscreen can vary and can include but is not limited to, a resistive touchscreen, a surface capacitive touchscreen, a projected capacitive touchscreen, a surface acoustic wave touchscreen, and an infrared touchscreen. In other embodiments display 301 can include another type of display device capable of rendering a graphical user interface (GUI) that can be interfaced with using other types of input devices (e.g., other than a touchscreen), such as a keypad, a keyboard, a mouse, gesture controls, electromechanical buttons/knobs, etc.

The one or more input devices 119 can display one or more interactive GUI that facilitate accessing and/or controlling various functions and/or application of the vehicle 120. The one or more input devices 119 can display one or more interactive GUIs that facilitate accessing and/or controlling various functions and/or applications. The one or more input devices 119 can comprise one or more computerized devices, which can include, but are not limited to: personal computers, desktop computers, laptop computers, cellular telephones (e.g., smart phones), computerized tablets (e.g., comprising a processor), smart watches, keyboards, touchscreens, mice, a combination thereof, and/or the like. An entity of the system 100 can utilize the one or more input devices 119 to input data into the system 100. Additionally, the one or more input devices 119 can comprise one or more displays that can present one or more outputs generated by the system 100 to an entity. For example, the one or more displays can include, but are not limited to: cathode-ray tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

For example, the one or more input devices 119 can comprise a touchscreen that can present one or more graphical touch controls that can respectively correspond to a control for a function of the vehicle 120, an application, a function of the application, interactive data, a hyperlink to data, and the like, wherein selection and/or interaction with the graphical touch control via touch activates the corresponding functionality. For instance, one or more GUIs displayed on the one or more input devices 119 can include selectable graphical elements, such as buttons or bars corresponding to a vehicle navigation application, a media application, a phone application, a back-up camera function, a car settings function, a parking assist function, and/or the like. In some implementations, selection of a button or bar corresponding to an application or function can result in the generation of a new window or GUI comprising additional selectable icons or widgets associated with the selected application. For example, selection of the media application can result in generation of a new GUI or window that includes additional buttons or widgets for different media sources (e.g., radio, a streaming music system, music from an auxiliary input device or phone, etc.), different radio stations, volume controls, and the like. The type and appearance of the controls can vary. For example, the graphical touch controls can include icons, symbols, widgets, windows, tabs, text, images, a combination thereof, and/or the like.

In an example GUI that can be presented after the operation of one or more embodiments, occupants of vehicle 120 can be queried to provide feedback regarding the detection of a context by context component 254, the media content item selected for the content by vehicle education component 252, and the output device selected for output by media component 256. As described below with FIGS. 8A-8B, this feedback can facilitate the adaption of one or more embodiments to different types of drivers, vehicles, and contexts.

The one or more input devices 119 can comprise suitable hardware that registers input events in response to touch (e.g., by a finger, stylus, gloved hand, pen, etc.). In some implementations, the one or more input devices 119 can detect the position of an object (e.g., by a finger, stylus, gloved hand, pen, etc.) over the one or more input devices 119 within close proximity (e.g., a few centimeters) to touchscreen without the object touching the screen. As used herein, unless otherwise specified, reference to "on the touchscreen" refers to contact between an object (e.g., an entity's finger) and the one or more input devices 119 while reference to "over the touchscreen" refers to positioning of an object within close proximity to the touchscreen (e.g., a defined distance away from the touchscreen) yet not contacting the touchscreen.

The type of the input devices 119 can vary and can include, but is not limited to: a resistive touchscreen, a surface capacitive touchscreen, a projected capacitive touchscreen, a surface acoustic wave touchscreen, and an infrared touchscreen. In various embodiments, the one or more input devices 119 can be positioned on the dashboard of the vehicle 120, such as on or within the center stack or center console of the dashboard. However, the position of the one or more input devices 119 within the vehicle 120 can vary.

Figure 7:
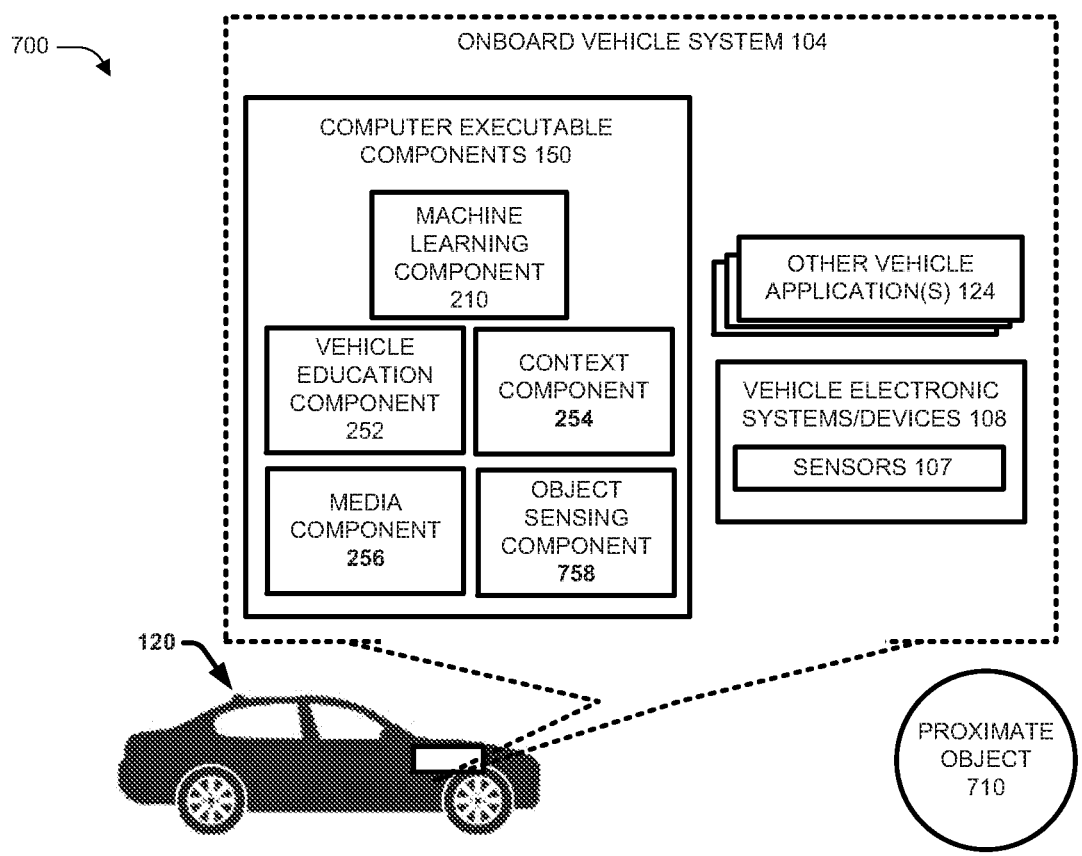
FIG. 7 illustrates a block diagram of another example, non-limiting, system that further includes object sensing component that can facilitate the selection of content items based on determined proximity to different types of objects, in accordance with one or more embodiments of the disclosed subject matter.

FIG. 7 illustrates a block diagram of another example, non-limiting, system 700 that further includes object sensing component 758 that can facilitate the selection of media content items based on determined proximity of vehicle 120 to different types of objects, in accordance with one or more embodiments. Repetitive description of like elements employed in respective embodiments is omitted for sake of brevity.

In one or more embodiments, object sensing component 758 can identify an object within proximity of the vehicle and this identification can be used as a determined context for the selection of media content items by vehicle education component 252. For example, one or more embodiments can determine a proximity of proximate object 710. Once identified by object sensing component 758, context component 254 can determine a content based on the object identified, e.g., an automobile, a truck, a bike, a pedestrian, or a large animal. As described with other contexts above, with different identified proximate objects 710, vehicle education component 252 can select one or more media content items for presentation. As with other contexts described above, selected media content items can perform a combination of different functions, including but not limited to, notifying (e.g., a bicycle is detected), suggesting features (e.g., at dusk, bicycles can be seen better with the headlights engaged), explain how to implement features (e.g., the headlight control is on the right side, and is presently highlighted by a flashing light), and explaining the benefits and advantages of the system that was able to detect the bicycle, along with other, related features.

For example, in a test drive, when proximate object 710 is identified, vehicle education component 252 can present, at an appropriate time, information describing the features of the vehicle 120 system that was able to identify the object, e.g., specialized systems to detect automobiles, trucks, bicycles, pedestrians, and large animals that are proximate to vehicle 120.

Figure 8A:
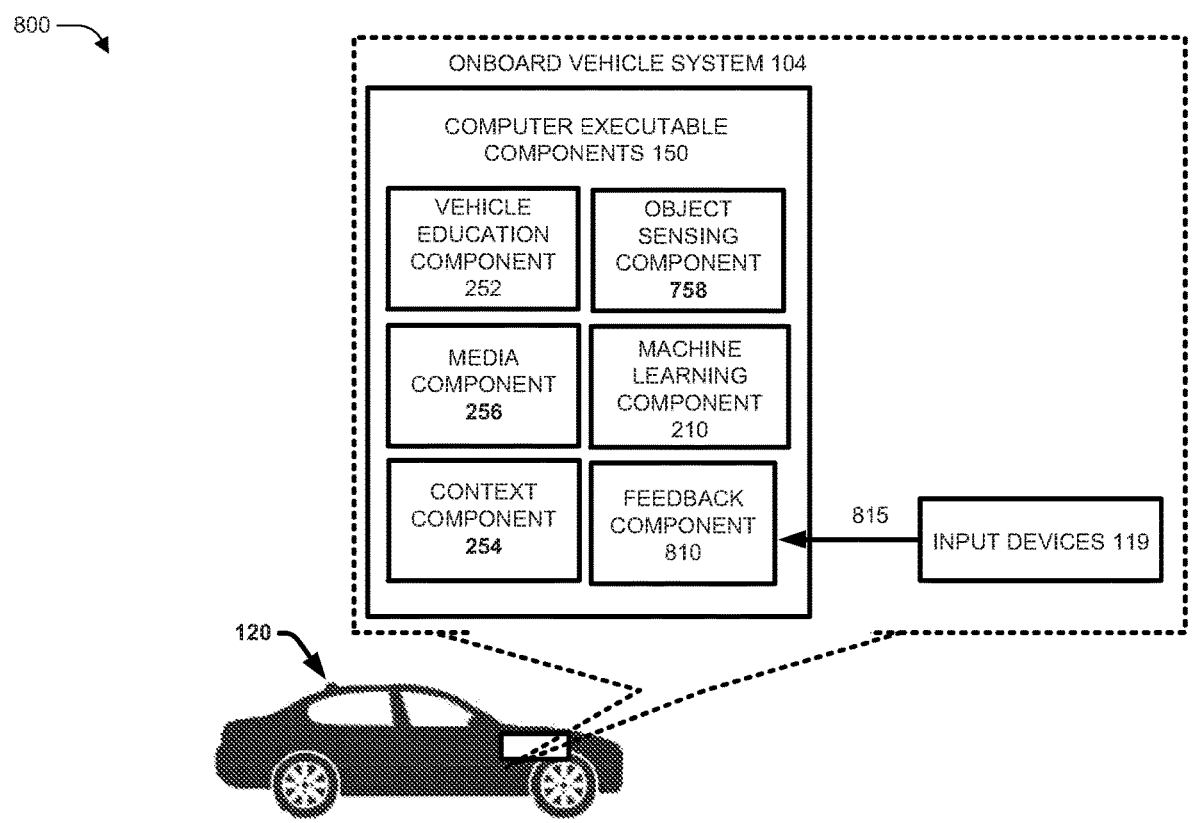
FIG. 8A illustrates a block diagram of an example, non-limiting system that can utilize machine learning to facilitate providing educational media content items based on a determined context of a vehicle or driver of the vehicle, in accordance with one or more embodiments of the disclosed subject matter.

FIG. 8A illustrates a block diagram of an example, non-limiting system 800 that can utilize machine learning to facilitate providing educational media content items based on a determined context of a vehicle or driver of the vehicle, in accordance with one or more embodiments of the disclosed subject matter.

As noted with FIG. 6 above, after the operation of one or more embodiments, occupants of vehicle 120 can be queried by feedback component 810 to provide feedback 815 regarding the detection of a context by context component 254, the media content item selected for the content by vehicle education component 252, and the output device selected for output by media component 256. As described further below, this feedback can facilitate the updating of the criteria that can be used by machine learning component 210 to provide analysis to one or more of context component 254, vehicle education component 252, or media component 256, as well as other analysis performed by embodiments described herein.

Returning to the description of some of the characteristics of machine learning component 210, as noted above, this component can employ artificial intelligence and one or more machine learning techniques to facilitate various features and functionalities of the vehicle education systems discussed herein. In addition to the functions described above, it should be noted that machine learning component 210 can facilitate additional operations of embodiments. For example, in one or more embodiments, machine learning component 210 can learn, e.g., by neural networks discussed above, information regarding specific regular occupants of vehicle 120 and/or others that are authorized or unauthorized to occupy vehicle 120. Machine learning component 210 can further use occupant feedback (e.g., specific to a driver or other occupant) regarding what the detection of contexts and the presentation of media content items, as described above. For example, as noted above, occupants of vehicle 120 can provide feedback regarding the detection of a context by context component 254. If one or more embodiments are accurate in the detection of certain contexts, machine learning component 210 can learn sensor data patterns regarding this context, including what vehicle features/functions are accessed, the frequency of use, the order of use and the like. Based on learned patterns, one or more embodiments can further dynamically modify or adapt the criteria used by one or more embodiments to determine different contexts.

In this regard, the machine learning component 210 can perform classifications, correlations, inferences and/or expressions associated with principles of artificial intelligence. For instance, the machine learning component 210 can employ an automatic classification system and/or an automatic classification. In one example, the machine learning component 210 can employ a probabilistic and/or statistical-based analysis (e.g., factoring into the analysis utilities and costs) to learn and/or generate inferences. The machine learning component 210 can employ any suitable machine-learning based techniques, statistical-based techniques and/or probabilistic-based techniques. For example, the machine learning component 210 can employ expert systems, fuzzy logic, Support Vector Machines (SVMs), Hidden Markov Models (HMMs), greedy search algorithms, rule-based systems, Bayesian models (e.g., Bayesian networks), neural networks, other non-linear training techniques, data fusion, utility-based and deep context-based analytical systems, systems employing Bayesian models, etc. In another aspect, the machine learning component 210 can perform a set of machine learning computations. For example, the machine learning component 210 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 8B:
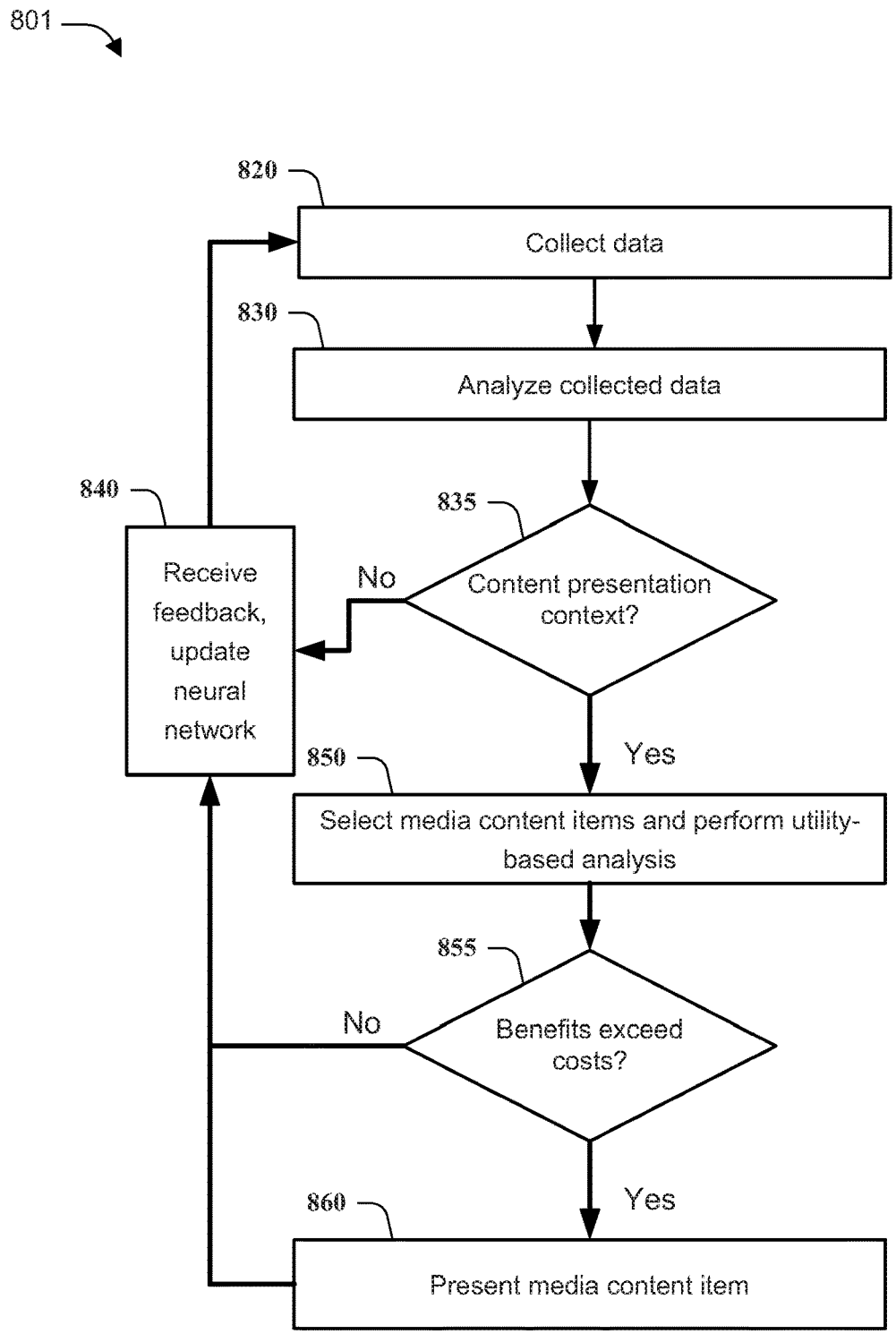
FIG. 8B provides a high-level flow diagram of an example process using machine learning component to facilitate providing educational media content items based on a determined context of a vehicle or driver of the vehicle, in accordance with one or more embodiments of the disclosed subject matter.

FIG. 8B provides a high-level flow diagram of an example process 801 using machine learning component 210 to facilitate providing educational media content items based on a determined context of a vehicle or driver of the vehicle, in accordance with one or more embodiments of the disclosed subject matter.

At block 820 one or more embodiments can collect data from the operation of vehicle 120 by the driver, e.g., by one or more of data from sensors 107, preferences of the driver, or external data received regarding other details. At block 830, one or more embodiments can analyze the collected data, e.g., by context component 254 employing machine learning component 210 to compare the collected data to one or more neural networks. Estimated data that can be generated at this block can include an inferred intent of the driver.

At block 835, based on this analysis, one or more embodiments can determine that the collected data corresponds to a content presentation context. Based on this determination, at block 850, one or more embodiments can select a media content item (e.g. relating to a feature of the vehicle) and perform a utility-based analysis based on the determined context, the inferred driver intent and the media content item. As noted above, in one or more embodiments, the utility-based analysis can factor the cost of making an incorrect selection versus the benefit of making a correct selection. When, as shown at block 855, benefits exceed costs, the media content item can be presented at block 860.

When, at block 835, one or more embodiments determine that the collected data does not correspond to a content presentation context, at block 840 feedback can be requested (e.g., at a later time, when a driver can respond) with respect to their intent with respect to the context determined not to trigger a presentation of content items. Based on this feedback, one or more neural networks that can provide analysis of future contexts can be updated to include these new results. It should further be noted that, as depicted, this type of feedback request leading to neural network updating at block 840 can occur based on, for example, block 860 where a media content item was presented.

Figure 9:
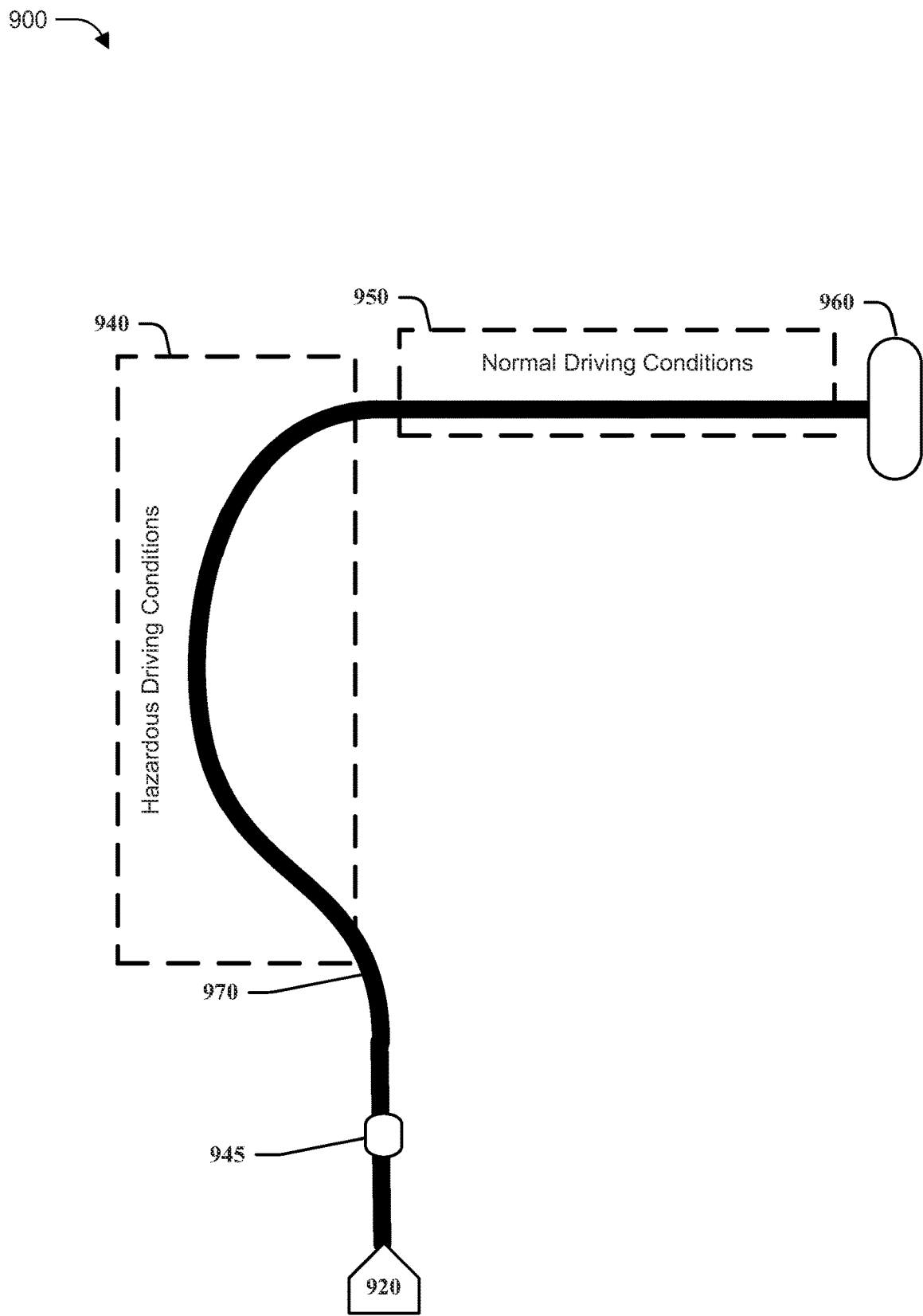
FIG. 9 illustrates an example road diagram that can be part of a context upon which the provision of educational media content items can be based, in accordance with one or more embodiments of the disclosed subject matter.

FIG. 9 illustrates an example road diagram 900 that can be part of a context upon which the provision of educational media content items in vehicle 120 can be based, in accordance with one or more embodiments. Repetitive description of like elements employed in respective embodiments is omitted for sake of brevity. In an example discussed with the features of FIG. 9, context component 254 can receive location information from location information receiver 466 relating to vehicle 120 and, in one or more embodiments, this location information can include a geographic location cross-referenced to a location on a road, e.g., some point on road 970 of example road diagram 900.

Road diagram 900 includes road 970 with an area of hazardous driving conditions 940 and an area with normal driving conditions. In an example, the road segments are labeled as such based on variable features of road 970. In an example, vehicle 120 can begin at start 920 and travel toward end 960. During this travel, context component 254 is using sensors (e.g., sensors 107) and external data (e.g., from computer server 180 via networks 114). One way that this combination can be used to determine a context is to use the received location information noted above to determine a present location, as well as estimated future locations for vehicle 120. In this example, point 945 in FIG. 9 represents this location. Based on this location, context component 254 can employ communication unit 128 to connect via networks 114 to computer server 180.

In one or more embodiments, as discussed above with FIG. 4, computer server 180 can serve information associated with variable driving conditions on road 970, e.g., conditions varying based on temporary factors, e.g., weather, accidents, lane closures, and construction. Continuing discussion of the example above, based on information retrieved from computer server 180, one or more embodiments can determine that the labeled portion of road 970 is subject to hazardous driving conditions 940. Further, hazardous driving conditions 940 can be determined by analysis performed external to vehicle 120, e.g., at computer server 180 based on weather or traffic warnings. In an alternative embodiment, context component 254 can determine that a combination of detected and retrieved factors can amount to hazardous driving conditions 940, specifically for one or both of vehicle 120 (e.g., snow expected and vehicle 120 does not have snow tires) and the driver (e.g., driver less experienced with the operation of vehicle 120). Further, as discussed with FIG. 6 above, one or more embodiments can monitor the driver's operation of vehicle 120 and, based on this operation, a road segment may or may not be determined to be hazardous, in accordance with one or more embodiments, e.g., a pattern of abrupt stopping can be indicative of a driving style that is less suited for slippery conditions.

Continuing this example, in a process similar to the approach discussed above for a determination of hazardous driving conditions 940, one or more embodiments can determine the region of normal driving conditions 950. Additional factors that can be assessed by one or more embodiments include, but are not limited to, accidents, stopped vehicles, current traffic congestion as well as predicted traffic congestion based on events such as sporting events and metropolitan rush hours. In this example, the absence of one or more of the above factors can lead to a prediction of normal driving conditions.

Switching from the operation of context component 254 to determine contexts, in this example, the determination of hazardous driving conditions 940 ahead can lead to vehicle education component 252 selecting a media content item based on the determination. Similar to the approach described above with FIG. 2, one or more embodiments can select media content items that identify explain the operation of various safety features of vehicle 120. Further, if driving behavior is indicative of inexperience with the use of safety features, additional media content items can be selected. For example, context component 254 can detect that a driver is pumping the brakes of vehicle 120 instead of braking steadily and enabling the anti-lock braking systems to function. In one or more embodiments, this improper breaking can be detected by sources that can include, but are not limited to, accelerometer 462 and vehicle electronic systems and devices 155. Based on this detected unfamiliarity of the driver with safety systems relevant to the predicted hazardous driving conditions, one or more embodiments can select additional media content items to explain the hazards predicted and provide educational materials to mitigate the potential hazards.

In the test drive context discussed above, any type of driving conditions (e.g., good or bad) can cause the selection of media content items describing the safety systems operating in vehicle 120. In the short-term access vehicle example discussed above, one or more embodiments can also use media content items to familiarize the driver with feature available for use in vehicle 120.

Figure 10:
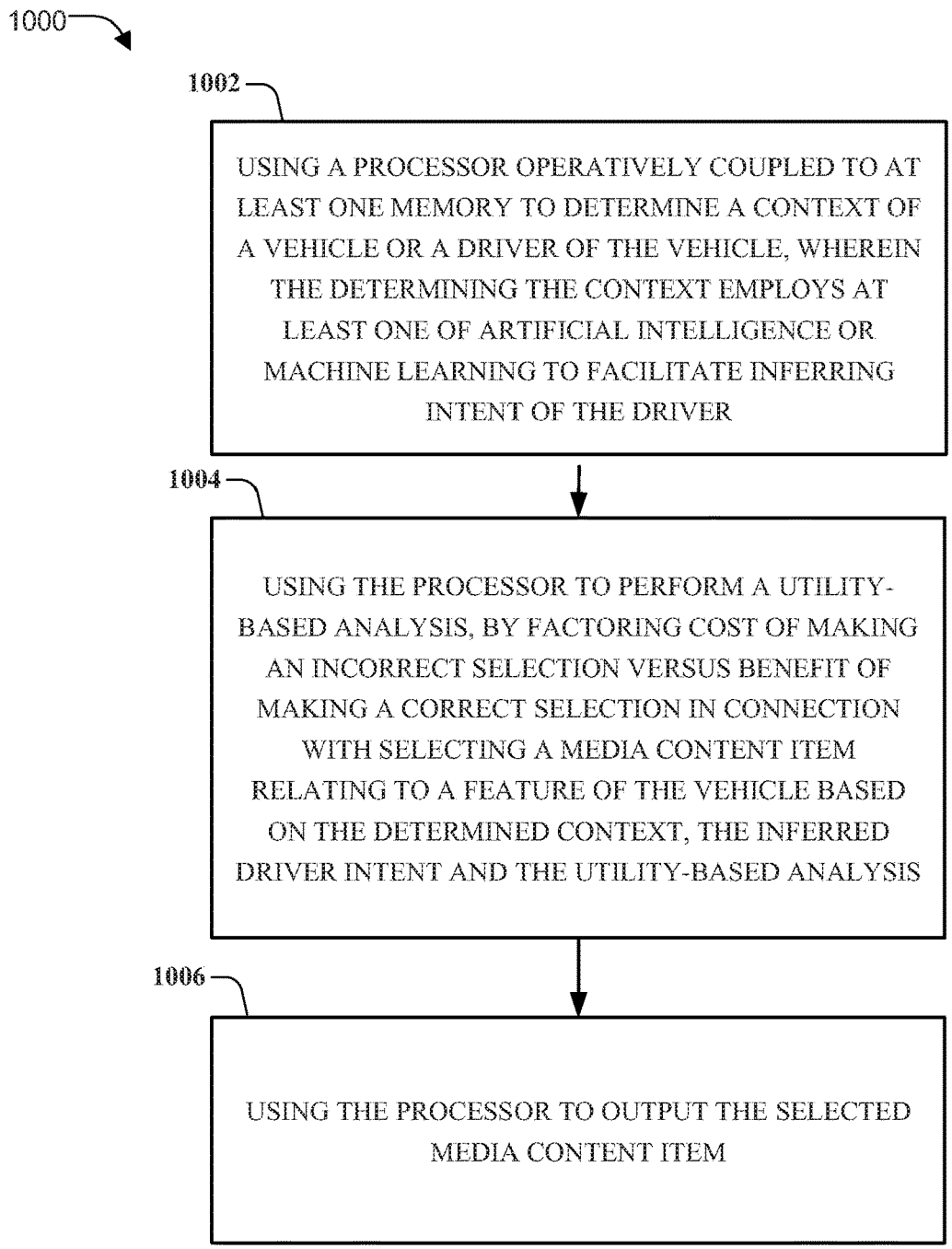
FIG. 10 provides a high-level flow diagram of an example computer-implemented method that can facilitate providing educational media content items based on a determined context of a vehicle or driver of the vehicle, in accordance with one or more embodiments of the disclosed subject matter.

FIG. 10 provides a high-level flow diagram of an example computer-implemented method 1000 that can facilitate providing educational media content items based on a determined context of a vehicle or driver of the vehicle, in accordance with one or more embodiments of the disclosed subject matter. One or more embodiments of method 1000 can be performed by computing device 110 executing computer executable components 150 that include, but are not limited to, to machine learning component 210, vehicle education component 252, context component 254, and media component 256, and/or systems (e.g., vehicle education systems) including system 100, system 200, system 300, system 400, system 600, system 700, and system 800, described above.

At 1002, a processor (e.g., processor 116 of computing device 110) operatively coupled to at least one memory (e.g., memory 118 coupled to processor 116 via system bus 130) can be used to determine (e.g., by sensors 107 coupled to processor 116 by interface ports 126 and system bus 130) a context (e.g., by context component 254) of a vehicle (e.g., vehicle 120, traveling in hazardous driving conditions 940) or a driver (e.g., a driver of an estimated size and familiarity with vehicle 120, is operating vehicle 120 too fast for hazardous driving conditions 940) of the vehicle. In an implementation, the determining the context employs at least one of artificial intelligence or machine learning (e.g., one or more neural networks of machine learning component 210) to facilitate inferring intent of the driver (e.g., as discussed with FIG. 2 above).

At 1004, the processor (e.g., processor 116) can be used to perform a utility-based analysis (e.g., described at block 855 of FIG. 8B), by factoring cost of making an incorrect selection versus benefit of making a correct selection in connection (e.g., by machine learning component 210) with selecting (e.g., by vehicle education component 252) a media content item (e.g., an audio media content item combined with lights illuminating vehicle 120 features) relating to a feature of the vehicle based on the determined context, the inferred driver intent and the utility-based analysis, e.g., media content items to highlight vehicle 120 features that can help vehicle 120 and driver adapt to the determined conditions, such as traction control, ABS brakes, and other like features.

At 1006, the processor (e.g., processor 116) can be used to output the selected media content item, e.g., the audio media content item can be output (e.g., by media component 256 using speaker 308), while feature lights 309 illuminate the buttons to activate traction control.

Figure 11:
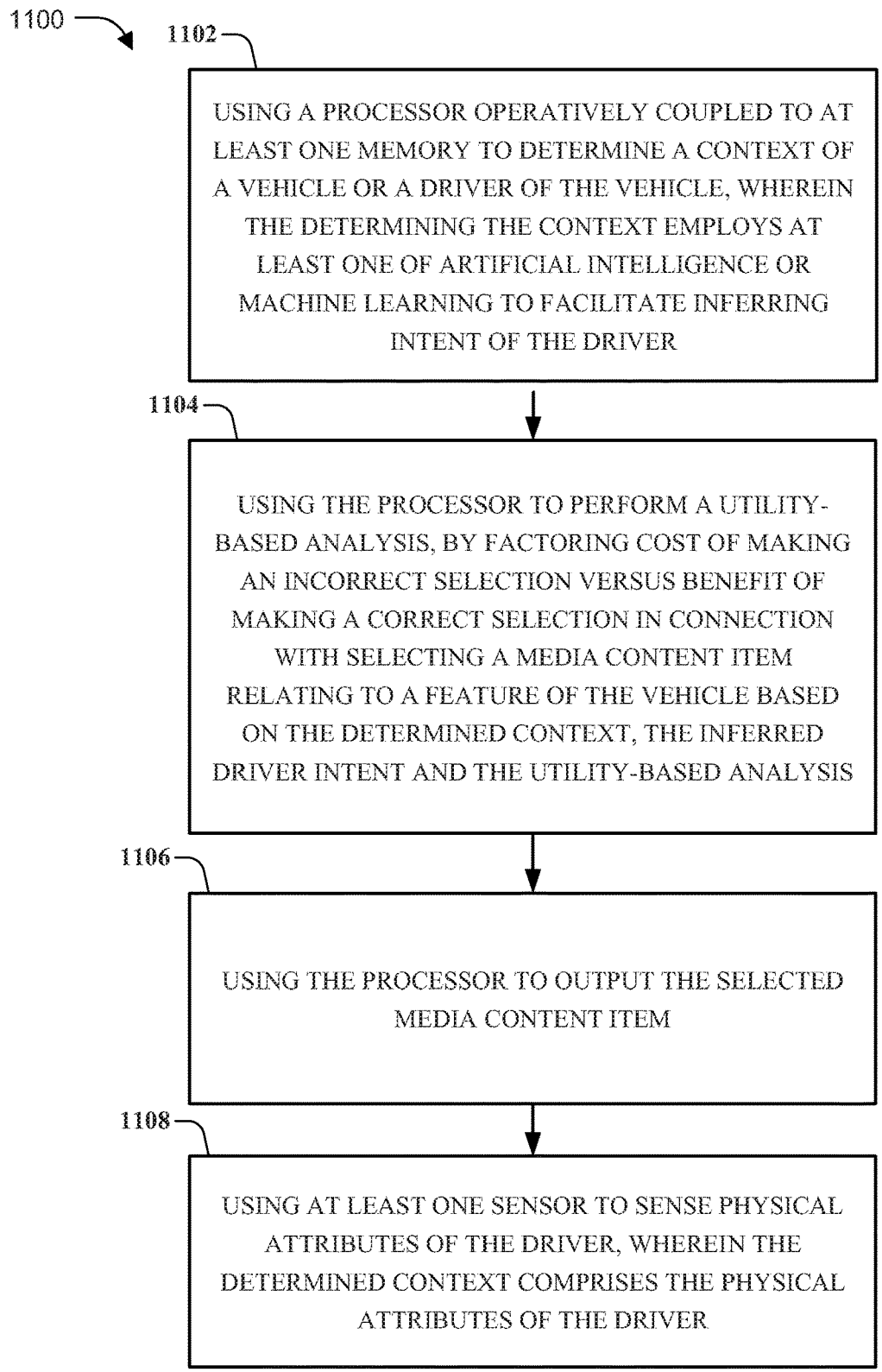
FIG. 11 provides a high-level flow diagram of another example computer-implemented method that can facilitate providing educational media content items based on a determined context of a vehicle or driver of the vehicle, in accordance with one or more embodiments of the disclosed subject matter.

FIG. 11 provides a high-level flow diagram of another example computer-implemented method 1100 that can facilitate providing educational media content items based on a determined context of a vehicle or driver of the vehicle, in accordance with one or more embodiments of the disclosed subject matter. One or more embodiments of method 1100 can be performed by computing device 110 executing computer executable components 150 that include, but are not limited to, to vehicle education component 252, context component 254, and media component 256, and/or systems (e.g., vehicle education systems) including system 100, system 200, system 300, system 400, system 600, system 700, and system 800, described above. Repetitive description of like elements employed in respective embodiments is omitted for sake of brevity.

At 1102, a processor (e.g., processor 116 of computing device 110) operatively coupled to at least one memory (e.g., memory 118 coupled to processor 116 via system bus 130) can be used to determine (e.g., by sensors 107 coupled to processor 116 by interface ports 126 and system bus 130) a context (e.g., by context component 254) of a vehicle (e.g., vehicle 120, traveling in hazardous driving conditions 940) or a driver (e.g., a driver of an estimated size and familiarity with vehicle 120, is operating vehicle 120 too fast for hazardous driving conditions 940) of the vehicle. In an implementation, the determining the context employs at least one of artificial intelligence or machine learning (e.g., one or more neural networks of machine learning component 210) to facilitate inferring intent of the driver (e.g., as discussed with FIG. 2 above).

At 1104, the processor (e.g., processor 116) can be used to perform a utility-based analysis (e.g., described at block 855 of FIG. 8B), by factoring cost of making an incorrect selection versus benefit of making a correct selection in connection (e.g., by machine learning component 210) with selecting (e.g., by vehicle education component 252) a media content item (e.g., an audio media content item combined with lights illuminating vehicle 120 features) relating to a feature of the vehicle based on the determined context, the inferred driver intent and the utility-based analysis, e.g., media content items to highlight vehicle 120 features that can help vehicle 120 and driver adapt to the determined conditions, such as traction control, ABS brakes, and other like features.

At 1106, the processor (e.g., processor 116) can be used to output the selected media content item, e.g., the audio media content item can be output (e.g., by media component 256 using speaker 308), while feature lights 309 illuminate the buttons to activate traction control. At 1108 at least one sensor (e.g., the combination of rearview mirror angle sensor 510 and side-mirror angle sensor 530) can be used to sense physical attributes (e.g., the size) of the driver, wherein the determined context is updated to comprise the physical attributes of the driver, e.g., during hazardous driving conditions 940, the driver, having the size estimated above, can benefit from instructions as to how to adjust the driver's seat to provide an even safer environment.

Figure 12:
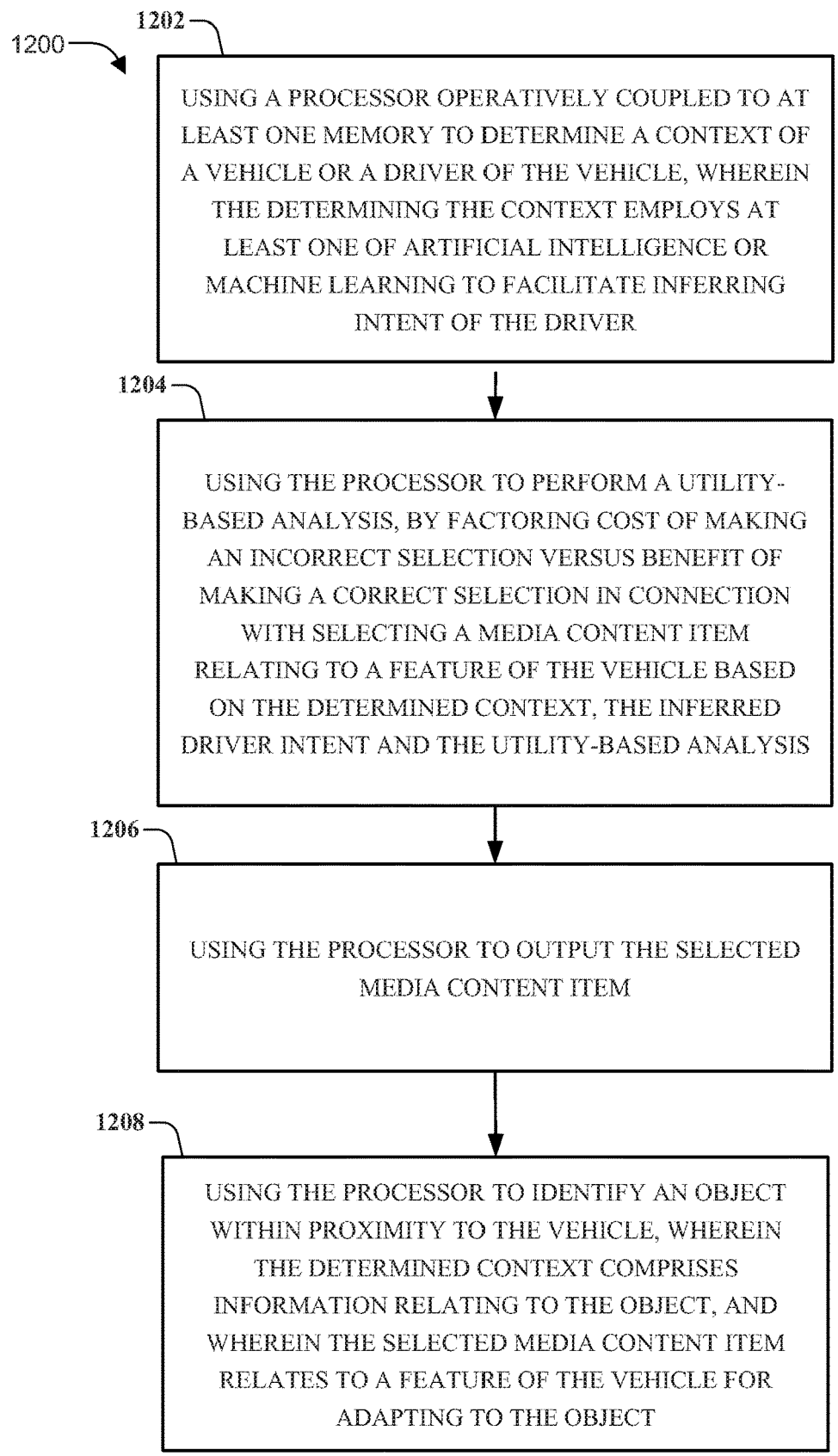
FIG. 12 provides a high-level flow diagram of another example computer-implemented method that can facilitate providing educational media content items based on a determined context of a vehicle or driver of the vehicle, in accordance with one or more embodiments of the disclosed subject matter.

FIG. 12 provides a high-level flow diagram of another example computer-implemented method 1200 that can facilitate providing educational media content items based on a determined context of a vehicle or driver of the vehicle, in accordance with one or more embodiments of the disclosed subject matter. One or more embodiments of method 1200 can be performed by computing device 110 executing computer executable components 150 that include, but are not limited to, to vehicle education component 252, context component 254, and media component 256, and/or systems (e.g., vehicle education systems) including system 100, system 200, system 300, system 400, system 600, system 700, and system 800, described above. Repetitive description of like elements employed in respective embodiments is omitted for sake of brevity.

At 1202 a processor (e.g., processor 116 of computing device 110) operatively coupled to at least one memory (e.g., memory 118 coupled to processor 116 via system bus 130) can be used to determine (e.g., by sensors 107 coupled to processor 116 by interface ports 126 and system bus 130) a context (e.g., by context component 254) of a vehicle (e.g., vehicle 120, traveling in hazardous driving conditions 940) or a driver (e.g., a driver of an estimated size and familiarity with vehicle 120, is operating vehicle 120 too fast for hazardous driving conditions 940) of the vehicle. In an implementation, the determining the context employs at least one of artificial intelligence or machine learning (e.g., one or more neural networks of machine learning component 210) to facilitate inferring intent of the driver (e.g., as discussed with FIG. 2 above).

At 1204, the processor (e.g., processor 116) can be used to perform a utility-based analysis (e.g., described at block 855 of FIG. 8B), by factoring cost of making an incorrect selection versus benefit of making a correct selection in connection (e.g., by machine learning component 210) with selecting (e.g., by vehicle education component 252) a media content item (e.g., an audio media content item combined with lights illuminating vehicle 120 features) relating to a feature of the vehicle based on the determined context, the inferred driver intent and the utility-based analysis, e.g., media content items to highlight vehicle 120 features that can help vehicle 120 and driver adapt to the determined conditions, such as traction control, ABS brakes, and other like features.

At 1206, the processor (e.g., processor 116) can be used to output the selected media content item, e.g., the audio media content item can be output (e.g., by media component 256 using speaker 308), while feature lights 309 illuminate the buttons to activate traction control. At 1208, the processor (e.g., processor 116) can be used to identify an object within proximity to the vehicle (e.g., a truck is traveling close to vehicle 120 during hazardous driving conditions 940), wherein the determined context is updated to comprise information relating to the object (e.g., media content items can be selected that can audibly explain the best way to pass or follow the type of truck detected), and wherein the selected media content item is updated to relate to a feature of the vehicle for adapting to the object, e.g., if vehicle 120 is following the detected truck, the adaptive cruise control of vehicle 120 can be identified and explained, with feature lights 109 illuminating the controls of the cruise control.

What is claimed is:

1. A vehicle education system, comprising:
a processor, operatively coupled to at least one memory, that executes computer-executable components comprising:
a machine learning component that trains, using training data associated with vehicles and drivers, a machine learning model to infer intents of drivers based on contexts of the vehicles and the drivers, and select media content items related to features of the vehicles based on the contexts and the inferred intents of the drivers;
a context component that:
determines a context of a vehicle or a driver of the vehicle, wherein the context comprises the driver of the vehicle operating a feature of the vehicle,
infers, using the machine learning model, an intent of the driver based on the context, and
determines that the driver of the vehicle has repeatedly operating the feature of the vehicle in an incorrect manner with respect to the inferred intent of the driver;
a vehicle education component that selects, using the machine learning model, a media content item relating to the feature of the vehicle based on the determined context and the inferred intent of the driver, wherein the machine learning model performs a utility-based analysis by factoring cost of making an incorrect selection versus benefit of making a correct selection; and
a media component that outputs the selected media content item in response to a result of the utility-based analysis meeting a criterion.

2. The vehicle education system of claim 1, wherein the determined context further comprises a test drive of the vehicle.

3. The vehicle education system of claim 1, further comprising at least one sensor that senses physical attributes of the driver, wherein the determined context further comprises the physical attributes of the driver.

4. The vehicle education system of claim 1, wherein the context component receives location information relating to the vehicle, and wherein the determined context further comprises a geographic location based on the location information.

5. The vehicle education system of claim 4, wherein the determined context further comprises, based on the geographic location, a road feature, and wherein the selected media content item relates to a feature of the vehicle for adapting to the road feature.

6. The vehicle education system of claim 1, wherein the determined context further comprises information relating to driver operation of the vehicle, and wherein the selected media content item relates to a feature of the vehicle for adapting to the driver operation of the vehicle.

7. The vehicle education system of claim 1, further comprising an object sensing component that identifies an object within proximity to the vehicle, wherein the determined context further comprises information relating to the object, and wherein the selected media content item relates to a feature of the vehicle for adapting to the object.

8. The vehicle education system of claim 1, wherein the vehicle is a short-term access vehicle, wherein the determined context further comprises a determined driver familiarity with a model type of the short-term access vehicle, and wherein the selected media content item relates to a feature of the short-term access vehicle.

9. A computer-implemented method, comprising:
training, by a system comprising a processor, using training data associated with vehicles and drivers, a machine learning model to infer intents of drivers based on contexts of the vehicles and the drivers, and select media contents features of the vehicles based on the contexts and the inferred intents of the drivers;
determining, by the system, a context of a vehicle or a driver of the vehicle, wherein the context comprises the driver of the vehicle operating a feature of the vehicle;
inferring, by the system, using the machine learning model, an intent of the driver;
determining, by the system, that the driver of the vehicle has repeatedly operated the feature of the vehicle in an incorrect manner with respect to the inferred intent of the driver;
selecting, by the system, using the machine learning model, a media content item relating to a feature of the vehicle based on the determined context and the inferred intent of the driver, wherein the machine learning model performs a utility-based analysis by factoring cost of making an incorrect selection versus benefit of making a correct selection; and
outputting, by the system, the selected media content item in response to a result of the utility-based analysis meeting a criterion.

10. The computer-implemented method of claim 9, wherein the determined context further comprises a test drive of the vehicle.

11. The computer-implemented method of claim 9, further comprising using, by the system, at least one sensor to sense physical attributes of the driver, wherein the determined context further comprises the physical attributes of the driver.

12. The computer-implemented method of claim 9, further comprising receiving, by the system, location information relating to the vehicle, wherein the determined context further comprises a geographic location based on the location information.

13. The computer-implemented method of claim 12, wherein the determined context further comprises, based on the geographic location, a road feature, and wherein the selected media content item relates to a feature of the vehicle for adapting to the road feature.

14. The computer-implemented method of claim 9, wherein the determined context further comprises information relating to driver operation of the vehicle, and wherein the selected media content item relates to a feature of the vehicle for adapting to the driver operation of the vehicle.

15. The computer-implemented method of claim 9, further comprising identifying, by the system, an object within proximity to the vehicle, wherein the determined context further comprises information relating to the object, and wherein the selected media content item relates to a feature of the vehicle for adapting to the object.

16. The computer-implemented method of claim 9, wherein the vehicle is a short-term access vehicle, wherein the determined context further comprises a determined driver familiarity with a model type of the short-term access vehicle, and wherein the selected media content item relates to a feature of the short-term access vehicle.

17. A computer program product comprising a non-transitory computer readable medium having program instructions embodied therewith, the program instructions being executable by a processor to cause the processor to:
train, by the processor, using training data associated with vehicles and drivers, a machine learning model to infer intents of drivers based on contexts of the vehicles and the drivers, and select media contents features of the vehicles based on the contexts and the inferred intents of the drivers;
determine, by the processor, a context of a vehicle or a driver of the vehicle, wherein the context comprises the driver of the vehicle operating a feature of the vehicle;
infer, by the processor, using the machine learning model, an intent of the driver;
determining, by the processor, that the driver of the vehicle has repeatedly operated the feature of the vehicle in an incorrect manner with respect to the inferred intent of the driver;
select, by the processor, using the machine learning model, a media content item relating to a feature of the vehicle based on the determined context and the inferred intent of the driver, wherein the machine learning model performs a utility-based analysis by factoring cost of making an incorrect selection versus benefit of making a correct selection; and
output, by the processor, the selected media content item in response to a result of the utility-based analysis meeting a criterion.

18. The computer program product of claim 17, wherein the determined context further comprises a test drive of the vehicle.

19. The computer program product of claim 17, wherein the program instructions being executable by the processor to further cause the processor to:
employ, by the processor, at least one sensor to senses physical attributes of the driver, wherein the determined context further comprises the physical attributes of the driver.

20. The computer program product of claim 17, wherein the program instructions being executable by the processor to further cause the processor to:
receive, by the processor, location information relating to the vehicle, and wherein the determined context further comprises a geographic location based on the location information.

* * * * *